(12) United States Patent  
Kurosawa

(10) Patent No.: US 6,643,792 B1  
(45) Date of Patent: Nov. 4, 2003

(54) INTEGRATED CIRCUIT DEVICE HAVING CLOCK FREQUENCY CHANGING FUNCTION, COMPUTER SYSTEM USING THE INTEGRATED CIRCUIT DEVICE AND CLOCK FREQUENCY CHANGING METHOD

(75) Inventor: Yasuhiko Kurosawa, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 587 days.

(21) Appl. No.: 09/665,684

(22) Filed: Sep. 20, 2000

(30) Foreign Application Priority Data

Jul. 12, 2000 (JP) .................................... 2000-211685

(51) Int. Cl.⁷ .............................. G06F 1/08; G06F 1/12
(52) U.S. Cl. ...................................... 713/501; 713/400
(58) Field of Search ............................... 713/400, 500, 713/501, 600; 709/248, 400

(56) References Cited

U.S. PATENT DOCUMENTS 5,758,132 A * 5/1998 Strahlin ...................... 713/501
5,764,965 A * 6/1998 Poimboeuf et al. ......... 713/400
5,872,907 A   2/1999 Griess et al.
6,175,929 B1 * 1/2001 Hsu et al. ................... 713/500

OTHER PUBLICATIONS

Intel Mobile Pentium® III Processor in BGA2 and Micro–PGA2 Packages Datasheet Rev. 2.0; Intel (Jun. 2000), pp. 7–11.

* cited by examiner

Primary Examiner—Thomas M. Heckler
(74) Attorney, Agent, or Firm—Finnegan, Henderson, Farabow, Garrett & Dunner, L.L.P.

(57) ABSTRACT

Multi-processor system including processors, a host-PCI bridge, and other devices which are connected to each other by a processor bus and a clock control bus for clock frequency adjustment. Each of the processors, a host-PCI bridge, and other devices operate in synchronism with others based on clocks generated by incorporated clock generation circuits. Each of the processors, a host-PCI bridge, and other devices dynamically execute clock frequency changing operations to the incorporated clock generation circuits by using at least the clock control bus in synchronism with others. Thus, the frequencies of clocks generated by each of the processors, a host-PCI bridge, and other devices can be dynamically changed in synchronism with others.

21 Claims, 19 Drawing Sheets

|  | HOLD | DOWN |
|---|---|---|
| CLOCK FREQUENCY IS EXCESSIVELY HIGH | × | ○ |
| PRESENT CLOCK IS OPTIMUM | ○ | × |
| CLOCK FREQUENCY CAN BE INCREASED | × | × |

"○" REPRESENTS THAT SIGNAL IS ASSERTED
"×" REPRESENTS THAT SIGNAL IS NOT ASSERTED

FIG. 2

| HOLD | DOWN | STATE OF NEXT CLOCK |
|---|---|---|
| ○ | ○ | CLOCK FREQUENCY IS DECREASED |
| × | ○ | CLOCK FREQUENCY IS DECREASED |
| ○ | × | CLOCK FREQUENCY IS NOT CHANGED |
| × | × | CLOCK FREQUENCY IS INCREASED |

FIG. 3

|  | HOLD | DOWN |
|---|---|---|
| CLOCK FREQUENCY IS EXCESSIVELY HIGH | × | ○ |
| PRESENT CLOCK IS OPTIMUM | ○ | × |
| CLOCK FREQUENCY CAN BE INCREASED | × | × |
| CLOCK FREQUENCY IS PROHIBITED FROM BEING CHANGED | ○ | ○ |

FIG. 12

| HOLD | DOWN | STATE OF NEXT CLOCK |
|---|---|---|
| ○ | ○ | CLOCK FREQUENCY CHANGING PREPARATION INCOMPLETION |
| × | ○ | CLOCK FREQUENCY IS DECREASED |
| ○ | × | CLOCK FREQUENCY IS NOT CHANGED |
| × | × | CLOCK FREQUENCY IS INCREASED |

FIG. 13

INTEGRATED CIRCUIT DEVICE HAVING CLOCK FREQUENCY CHANGING FUNCTION, COMPUTER SYSTEM USING THE INTEGRATED CIRCUIT DEVICE AND CLOCK FREQUENCY CHANGING METHOD

CROSS-REFERENCE TO RELATED APPLICATIONS

This application is based upon and claims the benefit of priority from the prior Japanese Patent Application No. 2000-211685, filed Jul. 12, 2000, the entire contents of which are incorporated herein by reference.

BACKGROUND OF THE INVENTION

The present invention relates to a large-scale integrated circuit device (to be referred to as an LSI hereinafter) having a clock frequency changing function and a computer system using the large-scale integrated circuit and a clock frequency changing method.

In a conventional LSI operated with a clock, in order to secure the operation under a high frequency, any one of the following three methods is employed:

I. method for supposing the worst conditions in design to determine a clock frequency;

II. method for selecting a chip operated at a high frequency in inspection after manufacturing;

III. method for attaching a sensor for measuring the temperature of an LSI in operation and for controlling an operation frequency with software to decrease the operation frequency when the LSI temperature raises over a predetermined temperature.

The method I is applied to a relatively small number of products such as ASIC (Application Specific Integrated Circuit) for specific applications.

The method II is frequently applied to a large number of products such as general-purpose memories and microprocessors.

The method III is used as a method for preventing a timing error by decreasing an operation frequency when an LSI cannot be cooled even though a cooling fan or the like is used in a notebook type personal computer or the like.

In the prior art, for example, design conditions are too severe in the method I, and an LSI is operated at a frequency lower than an upper limit of the operable frequency. As a result, the LSI must be used with operation performance lower than the actual capability (maximum value of an operation frequency).

The design conditions in the method II are milder than those in the method I. However, conditions such as a peripheral temperature and a power supply voltage are often severer than the real usage conditions, and an LSI must be used in a state in which operation performance is lower than the actual operation performance.

Even in the method III, although the peripheral temperature is considered, conditions such as a power supply voltage are often severer than the real usage conditions, and an LSI must be used in a state in which operation performance is lower than the actual operation performance.

In the conventional technique described above, in general, the practical maximum operation frequency of an LSI is fixedly determined every product within a range of performance lower than the maximum performance of the LSI.

On the other hand, as described in U.S. Pat. No. 5,872,907, the following technique is also proposed. That is, when an error caused by an AC timing error is detected in a fault tolerant type computer, a clock frequency is changed (decreased) to improve the reliability of the system.

In some personal computer or the like, a mechanism for multiplying an operation frequency of a processor or the like with a base clock of a system bus or the like by setting a register may be incorporated. In the mechanism of this type, a clock frequency is changed by using interruption while the system is operated in a stable condition.

According to the clock frequency changing technique, a computer (more-specifically, LSI) can be operated to achieve the actual capability of the computer (LSI). For this reason, the technique is useful to solve the problems. However, in an actual operation state, in order to stably operate the LSI to achieve the maximum performance, the clock frequency changing technique is not always sufficient.

Therefore, the present inventor proposes "Clock Generation Circuit and Clock Generation Method" which can changes a clock frequency in Japanese Patent Application No. 11-318771 (unpublished), so that an LSI to which the clock generation circuit (or the clock generation method) is applied is stably operated to achieve the maximum performance in an actual operation state.

However, in any clock frequency changing technique, a device for dynamically changing a clock frequency in a system operation in synchronism with another LSI (clock generation circuit included therein) is not considered.

BRIEF SUMMARY OF THE INVENTION

Accordingly, it is an object of the present invention to provide an integrated circuit device having a clock frequency changing function which can dynamically change the frequency of a clock generated by the integrated circuit device in synchronism with another integrated circuit device, and a computer system having the integrated circuit device and a clock frequency changing method.

According to the present invention, there is provided an LSI which incorporates a clock generation circuit which can change a clock frequency, which is connected to a system bus and a clock control bus independent of the system bus together with another LSI, which operates in synchronous with the other LSI by the clock generated by the incorporated clock generation circuit, and which has a clock frequency changing function, including clock frequency changing means which dynamically executes changing of a clock frequency of the incorporated clock generation circuit by using at least the clock control bus in synchronism with another LSI.

When a computer system is configured such that a plurality of LSIs each having the above configuration are connected to the system bus and the clock control bus, by using the clock control bus for changing a clock frequency of every LSI, the clock frequency can be dynamically changed during system operation in synchronism with each other.

In order to change a clock frequency by using the clock control bus, at least the following two signals, i.e., a first signal representing that the clock frequency must be changed in a predetermined direction and a second signal representing that the clock frequency is changed in a direction opposing the direction of the first signal or that the clock frequency need not be changed are flowed through the clock control bus, and the clock frequency changing means includes clock state determination means for operating the first and second signals such that a present clock state can be designated, so that the clock frequency may be changed on the basis of the clock state designated by the first and second signals. When the clock state is represented by only the first and second signals, by a specific combination of the first signal representing that the change of the clock frequency is not unnecessary and the second signal representing that the clock frequency need not be changed in the predetermined direction, a clock state in which the clock frequency must be changed in the direction opposing the predetermined direction may be indicated. In addition, a third signal representing that the clock frequency must be changed in the direction opposing the predetermined direction may be added.

The system bus may also be used to change the clock frequency, and the clock frequency may be synchronously changed by using a bus transaction on the system bus. When the bus transaction on the system bus is used, a relatively high-speed clock can be controlled depending on the performance of the system bus.

In order to change the clock frequency by using the bus transaction on the system bus, the clock frequency changing means for an LSI serving as a master for a clock frequency changing operation using the bus transaction comprises:

means for detecting that a clock state which is represented by at least the first and second signals and which designates that a clock frequency must be changed is continued for a first number of clock cycles;

means for issuing the bus transaction for clock frequency changing to a target LSI of LSIs on the system bus and the clock control bus depending on the detection result of the detecting means; and timing adjustment means for waiting until a second number of clock cycles elapse after a normal completion response notification from the target for the issued bus transaction.

The clock frequency is changed after the second number of clock cycles elapse.

The clock frequency changing means for an LSI serving as a target which changes a clock frequency by using the bus transaction comprises normal completion response means for notifying a master of a normal completion response of the bus transaction when the bus transaction for clock frequency changing is issued from an LSI serving as a master, if the clock frequency can be changed, upon completion of execution of the bus transaction; and timing adjustment means for waiting until a predetermined number of clock cycles elapse after the normal completion response notification.

The clock frequency may be changed after the predetermined number of clock cycles (second number of clock cycle counts) elapse.

The frequency changing means for another LSI except for the LSIs of a master and a target comprises timing adjustment means for waiting until a predetermined number of clock cycles elapse after a normal completion response notification of a bus transaction from the target to the master when the bus transaction for clock frequency changing is issued from the master, if the clock frequency can be changed.

The clock frequency may be changed after the predetermined number of clock cycles (second number of clock cycles) elapse.

In the above configuration, it can be easily realized that changing of the clock frequency is synchronously performed by using the bus transaction on the system bus between LSIs.

If retry response means for returning a retry response to the master in a predetermined phase when the clock frequency cannot be changed is added to the target clock frequency changing means, the clock frequency can be synchronously changed between LSIs by retrying a bus transaction even though a clock frequency cannot be changed in the target.

If changing disable notification means for notifying another LSI that the clock frequency cannot be changed by simultaneously asserting two predetermined signals on the system bus which are set in a state in which only one of the signals is asserted in a normal state or a state in which both the signals are deasserted when the clock frequency cannot be changed is added to a clock frequency changing means for another LSI except for the LSIs of the master and the target, another LSI can be notified that the clock frequency cannot be changed without a new special signal. For this reason, a bus transaction can be retried. A function of returning a retry response to the master even though the two predetermined signals are simultaneously asserted may be added to the retry response means of the target. In addition, a dedicated changing disable notification signal may be prepared.

In an LSI according to the present invention, in a configuration in which a clock frequency changing operation using a bus transaction on a system bus is not applied, the clock frequency changing means comprises:

means for detecting a specific state in which a clock state requiring a clock frequency changing operation continues for a first number of clock cycles; and synchronization confirmation means for executing, at least once, an operation of confirming that clock frequency changing operations are synchronized with each other between the LSI and another LSI by operating at least the first or second signal at a predetermined timing when the specific state is detected by the detecting means and when the clock frequency can be changed.

The clock frequency is changed on the basis of the confirmation result of the synchronization confirmation means.

In the configuration described above, since it can be easily confirmed by using only a signal of the clock control bus that the clock frequency changing operations are synchronized with each other, synchronization of the clock changing operations can be secured by changing the clock frequency on the basis of the confirmation result. When a function of performing synchronization confirmation in the same manner as described above after the clock frequency is changed is added to the synchronization confirmation means, synchronization of the clock changing operations can be more reliably secured.

If the synchronization confirmation means comprises:

synchronization confirmation signal operation means for performing an operation of asserting at least one of the first and second signals at a predetermined first timing and then deasserting the asserted signal at a predetermined second timing when synchronization confirmation is executed once; and timing detecting means for detecting the presence/absence of coincidence of an operation timing obtained by the synchronization confirmation signal operation means and operation timings obtained by the synchronization confirmation signal operation means of all other LSIs, and synchronization is confirmed depending on the timing coincidence detection performed by the timing detecting means, synchronization confirmation can be easily confirmed. However, in this method, since the signals of the clock control buses are simultaneously asserted and deasserted in all the LSIs, an increase in speed of the clock control bus is more different than an increase in speed of the system bus. For this reason, unlike the method for using a bus transaction on the system bus described above, this method is preferably applied to a frequency changing operation of a relatively low-speed clock. As a matter of course, when a clock control bus having a sufficiently high speed as compared with the clock frequency is used, the above limitation is withdrawn.

If the clock frequency changing means comprises:

frequency changing preparation incompletion notification signal operation means for operating at least one predetermined signal of the clock control bus to set a state representing clock frequency changing preparation incompletion when the clock frequency cannot be changed; and clock frequency changing stop means for stopping a clock frequency changing operation when the clock frequency changing preparation incompletion is represented by an operation of the preparation incompletion notification signal operation means or an operation of a preparation incompletion notification signal operation means of another LSI, it is possible to stop the clock frequency changing operation when preparation for a clock frequency changing operation in any one of the LSIs connected to the system bus and the clock control bus is uncompleted. In this case, if, in place of the clock frequency changing stop means, clock frequency changing delaying means for delaying a clock frequency changing operation when clock frequency changing preparation incompletion is represented by an operation of the preparation incompletion notification signal operation means of its own LSI or another LSI, the clock frequency changing operation can be delayed when preparation for a clock frequency changing operation is uncompleted in any one of the LSIs connected to the system bus and the clock control bus. The delay time can be controlled by a duration of time of a state representing clock frequency changing preparation completion.

When a predetermined time or a time exceeding the predetermined time can be selected as the duration time of a state representing the clock frequency changing preparation incompletion, for example, the predetermined time represents that the clock frequency changing operation is stopped, and the time exceeding the predetermined time represents that the clock frequency changing operation is delayed by the time, so that the stop or delay of the clock frequency changing operation can also be selectively executed. In addition, a dedicated signal representing the clock frequency changing preparation incompletion can also be assigned as at least one predetermined signal described above. However, the specific states may be represented by using the first and second signals. For example, the clock frequency changing preparation incompletion may be represented by the first signal representing that the clock frequency need not be changed and the second signal representing the clock frequency changing preparation incompletion.

An LSI according to the present invention and having a clock frequency function includes:

a clock generation circuit;

means for issuing a bus transaction for clock frequency changing to the system bus when the usage right of the system bus can be acquired;

means for outputting a signal representing at least one of that a clock frequency is increased, that the clock frequency is decreased, and that the clock frequency is not changed to a clock control bus to notify another LSI connected to the system bus of a clock changing operation; and means for controlling the clock generation circuit to execute a clock frequency changing operation after a predetermined number of clock cycles elapse when a retry request is not answered from another LSI connected to the system bus, and for keeping a signal on the clock control bus to the signal representing that the clock frequency changing operation is not performed.

Another LSI according to the present invention and having a clock frequency changing function comprises:

a clock generation circuit;

means for receiving a bus transaction, issued from an LSI which acquires the usage right of a system bus to the system bus, for changing a clock frequency;

means for receiving a signal representing at least one of that a clock frequency is increased, that the clock frequency is decreased, and that the clock frequency is not changed;

means for returning a normal response to the LSI which acquires the usage right of the system bus when it is determined that a notified clock changing operation can be performed in response to the bus transaction, for controlling the clock generation circuit to execute a clock frequency changing operation after a predetermined number of clock cycles elapse, and for keeping a signal on the clock control bus to the signal representing that the changing operation is not performed.

In the configuration as described above, clock frequency changing operations can be synchronously performed between LSIs by using both the clock control bus and the system bus.

A still another LSI according to the present invention and having a clock frequency changing function comprises:

a clock generation circuit;

means for monitoring at least first and second signals output to a clock control bus which is independent of a system bus;

means for deasserting the second signal when its own LSI completes preparation for a clock frequency changing operation and it is detected, because the first signal is not asserted, that another LSI connected to the system bus completes preparation for a clock changing operation, and for asserting the first signal to establish synchronization after a first cycle time elapses; and means for deasserting the first signal to confirm that synchronous delay does not occur when a second cycle time elapses after the synchronization, and for controlling the clock generation circuit to execute a clock frequency changing operation when a third cycle time elapses after the synchronization.

A still another LSI according to the present invention and having a clock frequency changing function comprises:

a clock generation circuit;

means for monitoring at least one of first and second signals output to a clock control bus which is independent of a system bus;

means for determining that a clock frequency changing operation is requested when the first and second signals are asserted for a first cycle time, for asserting the first signal when preparation for the clock frequency changing operation is not completed, and for deasserting the first signal after a second cycle time elapses; and means for detecting, because the second signal is not asserted in the second cycle time, that another LSI connected to the system bus is prepared for a clock frequency changing operation, for asserting the second signal a third cycle time after the first signal is deasserted, for deasserting the second signal after the fourth cycle time elapses, for confirming that synchronization is established and controlling the clock generation circuit to execute a clock frequency changing operation.

In the configuration, clock frequency changing operations can be synchronously performed between LSIs by using a clock control bus.

The present invention is also exemplified as an invention related to a computer system including a plurality of LSIs each having the above configuration, the plurality of LSIs being connected to each other by a system bus and a clock control bus. In the computer system, by adding a system monitor bus for connecting the plurality of LSIs to each other and a system monitor device, connected to the system monitor device, for detecting a difference between the clock frequencies of the LSIs by loading pieces of information for determining clock frequencies of the clock generation circuits incorporated in the LSIs and comparing the pieces of information, it can be secured that the set states of the clock frequencies are matched to each other in the entire system.

The present invention related to the computer system is also exemplified as an invention related to a method, i.e., a clock frequency changing method.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 shows a table indicating the relationship between present clock states and combination output contents of a HOLD signal and a DOWN signal in the first embodiment;

FIG. 3 shows a table indicating the relationship between combinations of the HOLD signal and the DOWN signal and clock changing operation contents (next clock states) of LSIs in the first embodiment;

FIG. 12 shows a table indicating the relationship between present clock states and combination output contents of the HOLD signal and the DOWN signal according to a second embodiment of the present invention;

FIG. 13 shows a table indicating the relationship between combinations of the HOLD signal and the DOWN signal and clock changing operation contents (next clock states) of LSIs in the second embodiment;

DETAILED DESCRIPTION OF THE INVENTION

A preferred embodiment of a computer system using an LSI having a clock frequency changing function according to the present invention will now be described with reference to the accompanying drawings.

First Embodiment

Figure 1:
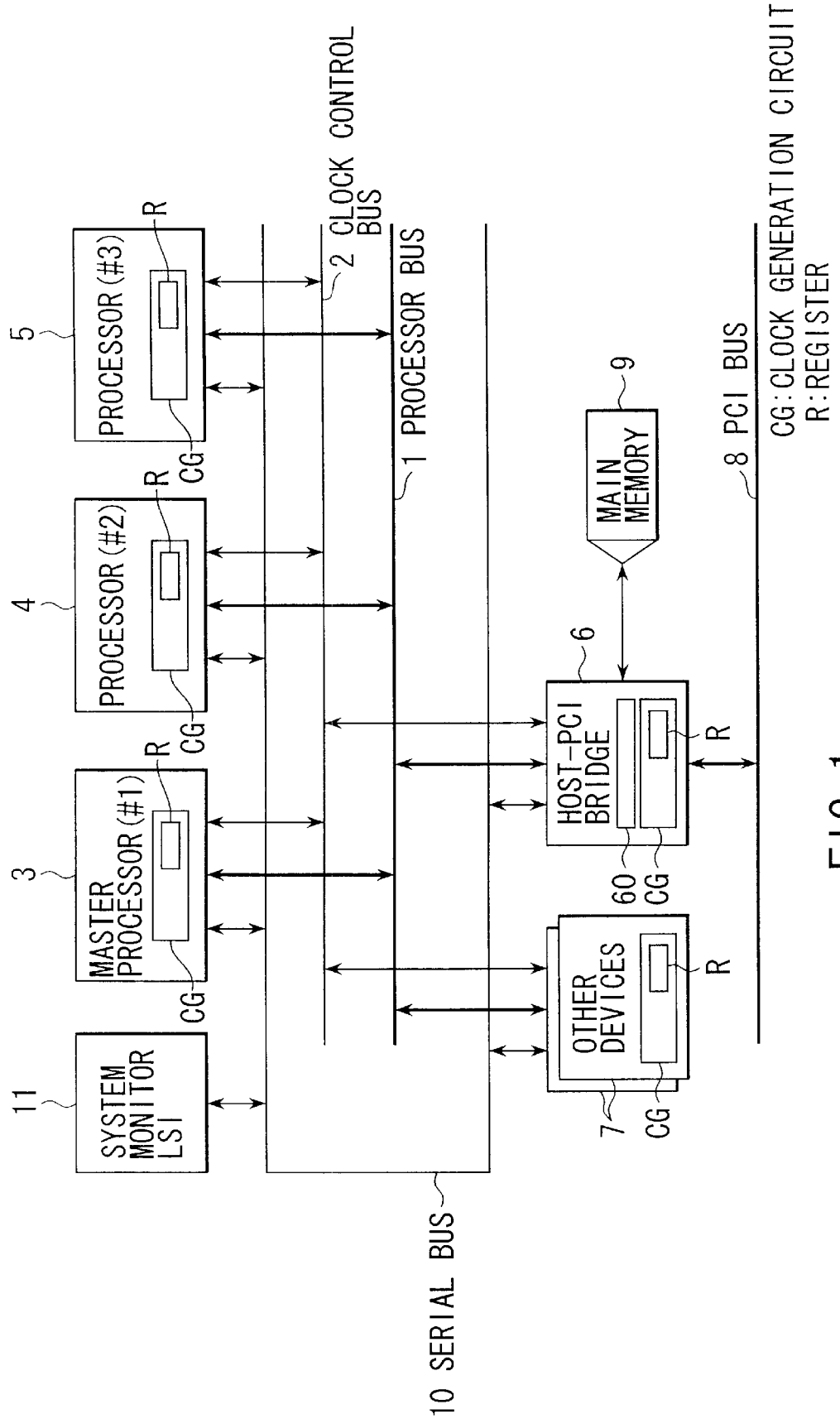
FIG. 1 is a block diagram showing the configuration of a computer system comprising a plurality of LSIs each having a clock frequency changing function according to a first embodiment of the present invention.

FIG. 1 is a block diagram showing the configuration of a computer system (multi-processor system) comprising a plurality of LSIs each having a clock frequency changing function according to the first embodiment of the present invention.

Referring to FIG. 1, a plurality of LSIs, i.e., processors 3 to 5 in which clock generation circuits CG which can dynamically change clock frequencies to optimum values depending on various conditions such as temperatures and environments are incorporated, a host-PCI (Peripheral Component Interconnect) bridge 6, and other devices 7 are connected to a processor bus 1 and a clock control bus 2. The host-PCI bridge 6 is also connected to a PCI bus 8 and a main memory 9. The host-PCI bridge 6 contains the function of a main memory controller, and it is also called a memory controller 6 in this document. Each of the clock generation circuits CG includes a frequency setting register R for designating a frequency of a clock generated by the clock generation circuit CG. The frequency setting register R represents the frequency that is generated by the clock generation circuit CG such that larger value of frequency setting register R corresponds to the higher clock frequency that CG generates.

The processors 3 to 5 comprise cache memories (not shown), in which parts of information in the main memory 9 are stored, inside or outside the processors 3 to 5. The contents of the cache memories, as is commonly known, are controlled such that the main memory 9 and the cache memories are coherent, i.e., cache coherency is kept.

The processor bus 1 is a bus (system bus) used when the processors (processors 3 to 5 or the like) mainly access the memory (e.g., the main memory 9). In some processor bus 1, a bus structure in which a signal line is used for transferring addresses and data in a time sharing manner or a bus structure in which independent signal lines are arranged for addresses/data is applied. Either one of the bus structures may be used. In this embodiment, it is assumed that the processor bus 1 comprises an address line (address bus) and a data line (data bus), and that a plurality of LSIs using the processor bus 1 are connected to both the address bus and the data bus. As the processor bus 1 having the bus structure described above, a PentiumPro R bus used in a PentiumPro processor or the like available from Intel Corporation is known. The device may be connected to only one of an address bus and a data bus as will be described later.

The clock control bus 2 is a bus for adjusting a clock frequency. The clock control bus 2 is constituted by wired-OR buses obtained by connecting two signals, e.g., the HOLD signal and the DOWN signal to each other by an open collector. The DOWN signal is a signal representing that a clock frequency must be changed in a predetermined direction, and is, in this embodiment, a signal (first signal) representing that the clock frequency must be decreased. The HOLD signal is a signal (second signal) representing that a clock frequency must be changed in a direction opposing the direction of the DOWN signal or representing that a change in clock frequency is not necessary.

The host-PCI bridge 6 is a bridge device for bi-directionally connecting the processor bus 1 and the PCI bus 8 such that a device on one of the processor bus 1 and the PCI bus 8 can access a device on the other bus. A memory controller 60 for performing access control to the main memory 9 is incorporated in the host-PCI bridge 6. The host-PCI bridge 6 can function as a bus master on the PCI bus 8.

The processors 3 to 5, the host-PCI bridge 6, and the other devices 7 connected to the processor bus 1 and the clock control bus 2 are connected to a system monitor LSI (system monitor device) 11 serving as a master of a serial bus 10 via a system monitor bus, e.g., the serial bus 10 having one-bit data line and a clock line like I$^2$C Bus (Inter IC Bus) defined by Philips. The system monitor LSI 11 is designed such that the values of frequency setting registers R in the clock generation circuits CG incorporated in the LSIs on the serial bus 10 can be read by issuing a bus transaction onto the serial bus 10. In this case, the system monitor LSI 11 periodically or occasionally reads the values of the frequency setting registers R of the LSIs in response to a request from software such as an OS (operating system) or a request of software operated by the system monitor LSI 11 itself.

Each of the LSIs, such as processors 3 to 5 or the like, connected to the processor bus 1 and the clock control bus 2 has a function of dynamically changing the frequency of a clock generated by the incorporated clock generation circuit CG by a method in which the frequency can be dynamically changed during an operation of the system and a stable operation can be achieved immediately after the changing operation.

In order to change the clock frequency, each LSI has a clock state determining function for outputting the HOLD signal and the DOWN signal in combinations shown in FIG. 2 depending on a present operation state, preferably, depending on a margin for a clock frequency in the present operation state. Referring to FIG. 2, "○" indicates that a signal is asserted, and "X" indicates that a signal is not asserted.

In the example in FIG. 2, as the present clock states, three types of states, i.e., a state in which "clock frequency is excessively high", a state in which "present clock (frequency thereof) is optimum", and a state in which "clock frequency can be increased" are defined. When "clock frequency is excessively high", the LSI asserts only the DOWN signal. When "present clock is optimum", the LSI asserts only the HOLD signal. When "clock frequency can be increased", the LSI does not assert both the HOLD signal and the DOWN signal.

The HOLD signals and the DOWN signals from the LSIs are connected to the clock control bus 2 by an open collector. For this reason, when any one of the LSIs asserts a signal (HOLD signal or DOWN signal) of the clock control bus 2, the logic of the signal is active (true) on the clock control bus 2. In addition, when all the LSIs deassert signals (HOLD signals or DOWN signals) of the clock control bus 2, the logic of the signals are inactive (false) on the clock control bus 2.

Each LSI prepares a clock frequency changing operation by a combination of the HOLD signal and the DOWN signal of the clock control bus 2. The relationship between combinations of the HOLD signal and the DOWN signal and clock changing operation contents (next clock states) of the LSIs is shown in FIG. 3.

In the example in FIG. 3, when both the HOLD signal and the DOWN signal of the clock control bus 2 are asserted, and when only the DOWN signal is asserted, the LSI begins to prepare a clock frequency to be decreased (the value of the frequency setting register R is decreased, e.g., −1). When only the HOLD signal of the clock control bus 2 is asserted, the LSI does not change the clock frequency. In addition, when both the HOLD signal and the DOWN signal of the clock control bus 2 are not asserted, the LSI starts preparation for increasing a clock frequency (the value of the frequency setting register R is increased, e.g., +1).

Preparation for changing a clock frequency according to the combination of the HOLD signal and the DOWN signal is started when a state in which the clock frequency determined by the combination of the HOLD signal and the DOWN signal is changed continues for a predetermined number of clock cycles, e.g., 10 or more clock cycles.

It is preferable that the clock frequency changing operations in the LSIs are simultaneously executed, i.e., that the clock frequency changing operations in the LSIs are executed in synchronism with each other. In this embodiment, a processor serving as a master in booting the system is used as a master for changing the clock frequency. In the embodiment of FIG. 1, the processor 3 serves as a master processor.

The processor 3 serving as the master for clock frequency changing operations issues a bus transaction for synchronously changing clock frequencies to the processor bus 1 when it is determined that the clock frequency should be changed. This transaction may simply represent that the clock frequency should be increased or decreased, or may simply represent that the clock frequency should be changed.

In this embodiment, the clock generation circuits CG each of which can change the clock frequency are incorporated in the LSIs connected to the processor bus 1, and the HOLD signal and the DOWN signal is connected to each of the LSIs. Therefore, a direction of a clock frequency changing operation is decided by each LSI itself on the basis of the combination of the HOLD signal and the DOWN signal in FIG. 3. For this reason, when a bus transaction representing only that the clock frequency should be changed is issued from the master processor 3 to the processor bus 1, other LSIs can execute a clock frequency changing operation.

As the bus transaction representing that the clock frequency should be changed, a dedicated bus command may be used, or access to a specific address (read or write) may be used. In this embodiment, the processor 3 serving as a master issues a write transaction to a predetermined address. When each LSI does not retry the access, the clock frequencies are changed simultaneously after a predetermined number of clock cycles, e.g., 100 clock cycles. The second embodiment (to be described later) employs a method using a dedicated bus command and a clock control bus.

Clock frequency changing operations in the LSIs will be properly described below with reference to FIGS. 4 to 11.

Figure 4:
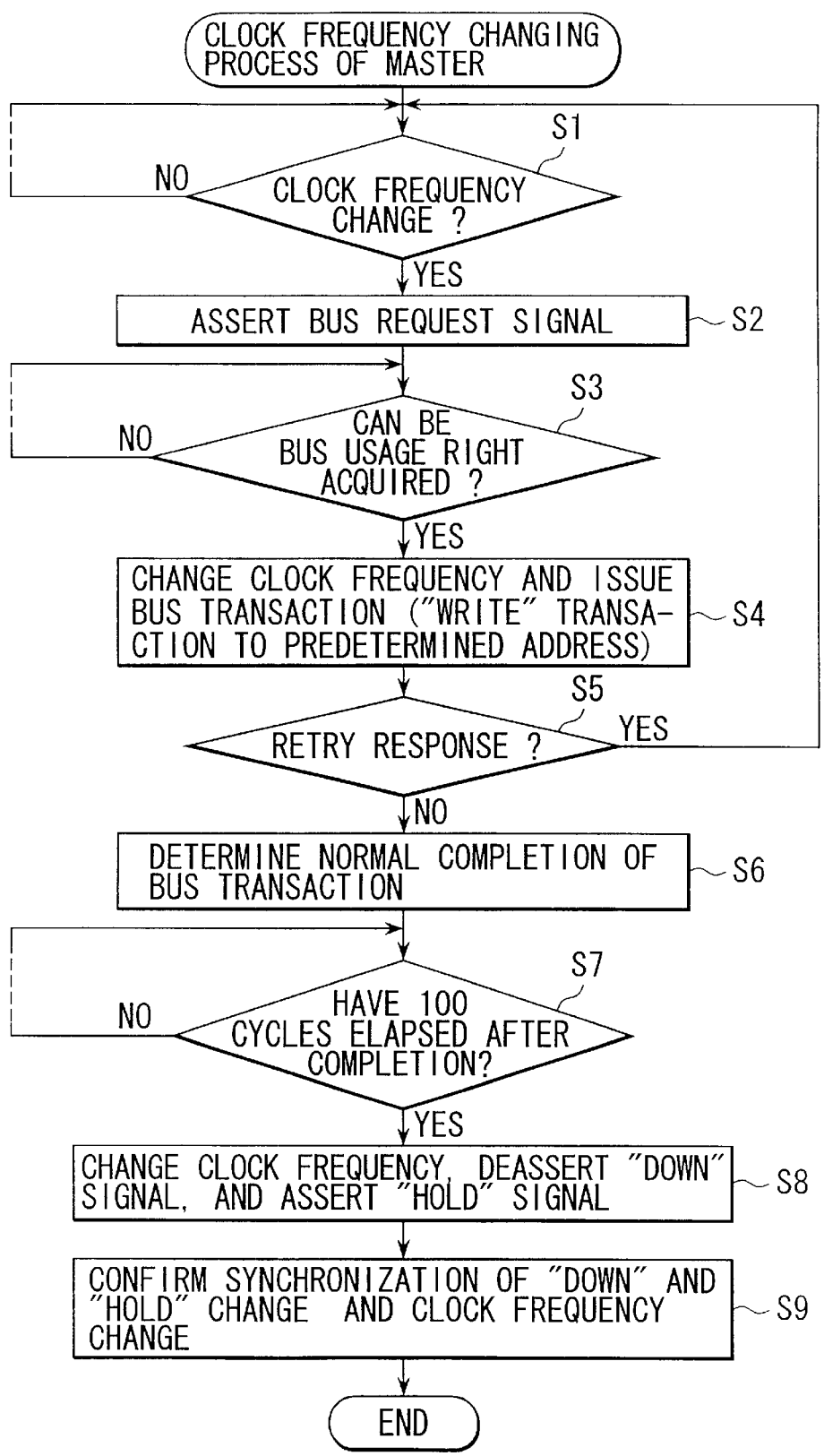
FIG. 4 is a flow chart for explaining a clock frequency changing operation of a master processor 3 in the first embodiment.
Figure 5:
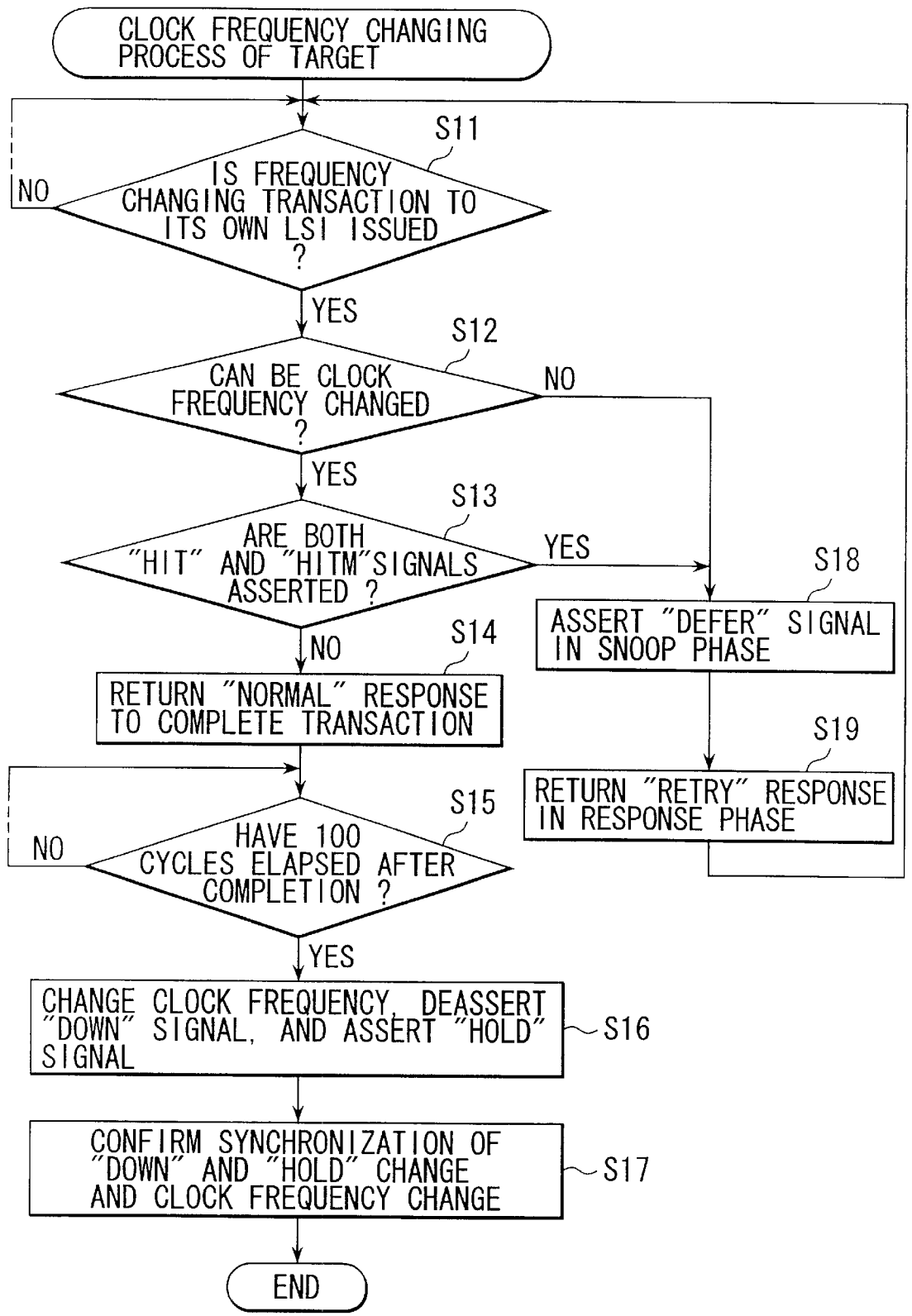
FIG. 5 is a flow chart for explaining a clock frequency changing operation of a target LSI (in this case, memory controller 60 of host-PCI bridge 6) in the first embodiment.
Figure 6:
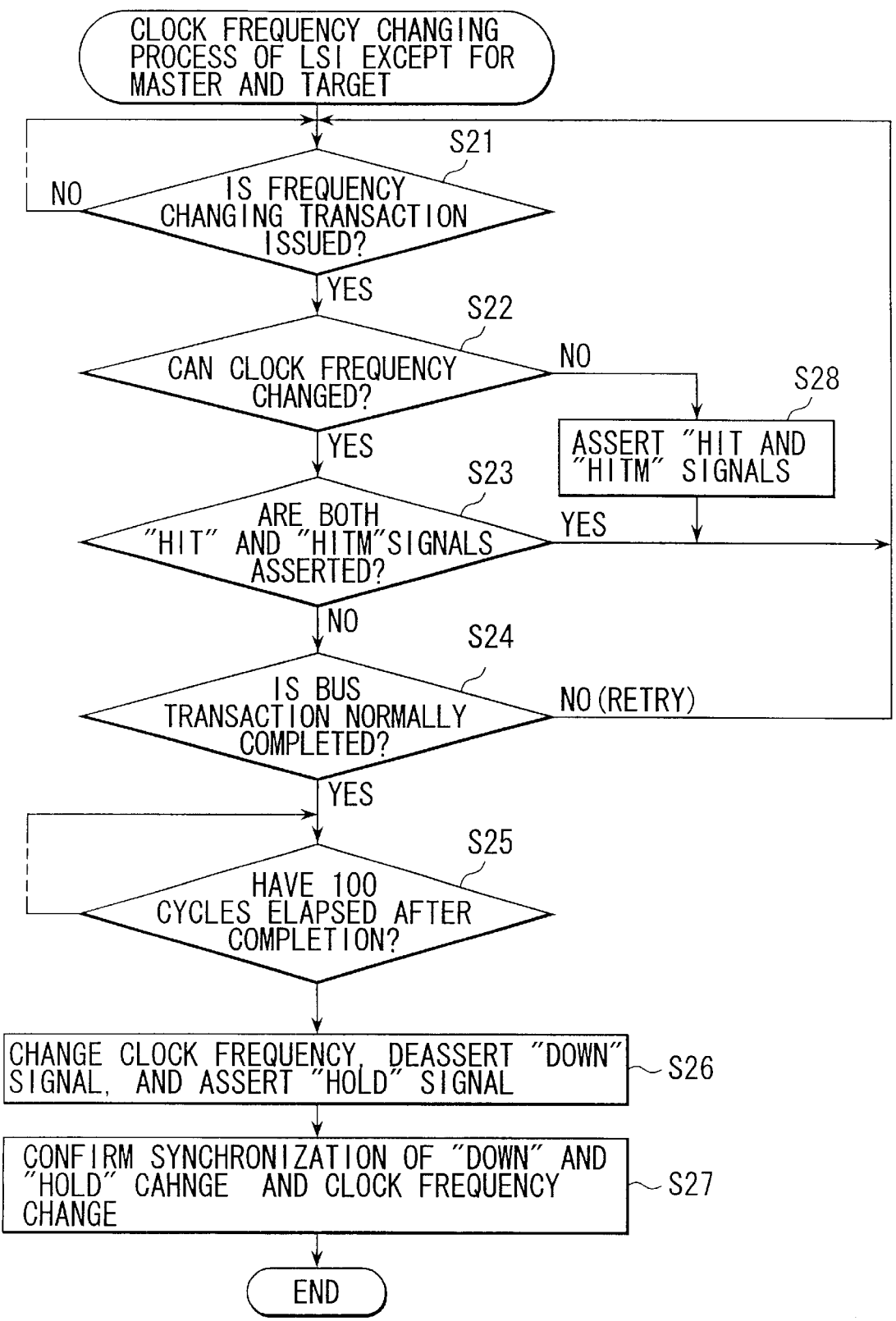
FIG. 6 is a flow chart for explaining a clock frequency changing operation of another LSI except for the LSI of a master processor and a target LSI in the first embodiment.
Figure 7:
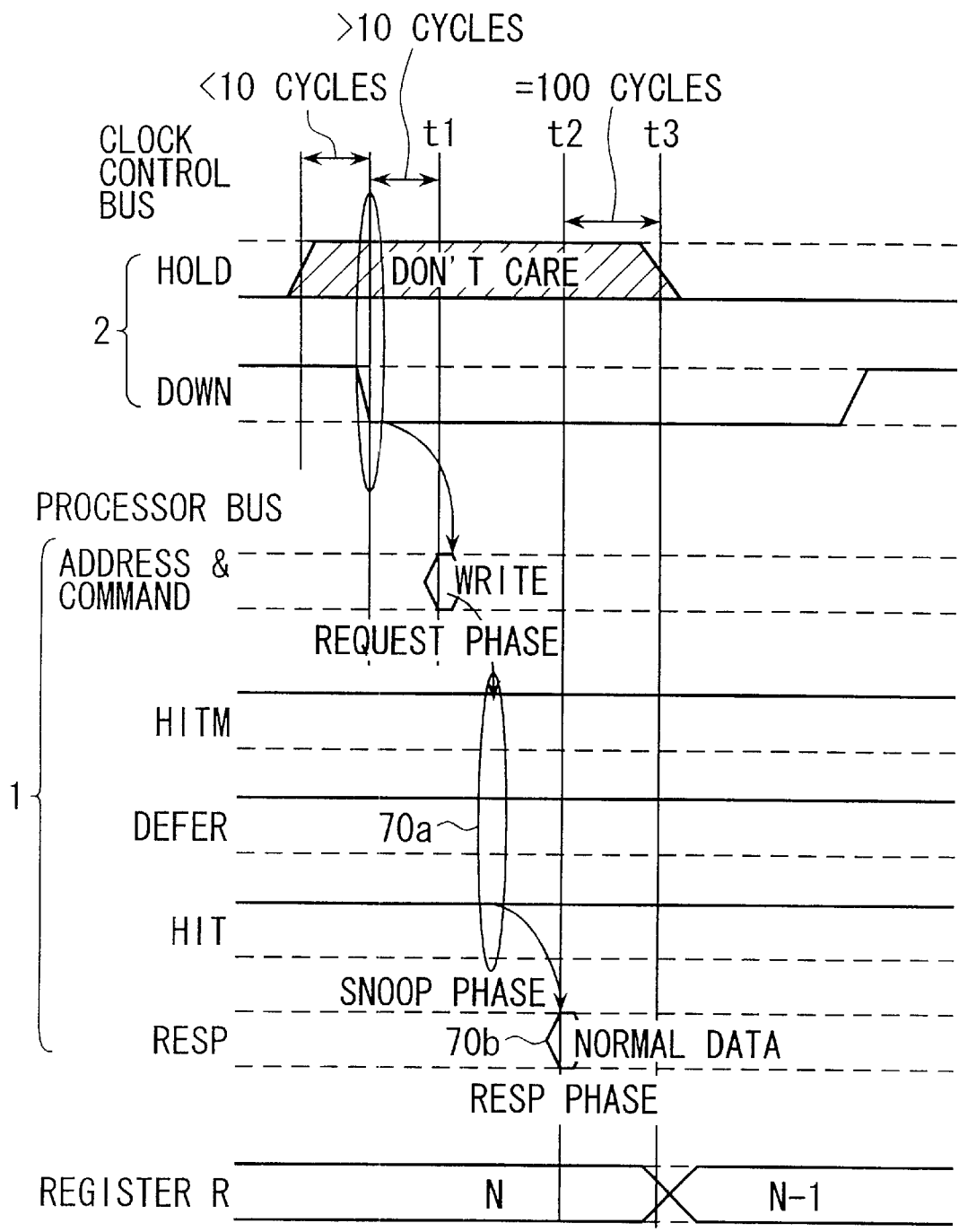
FIG. 7 is a timing chart obtained when retry is not performed to a bus transaction for clock frequency changing in the first embodiment.
Figure 8:
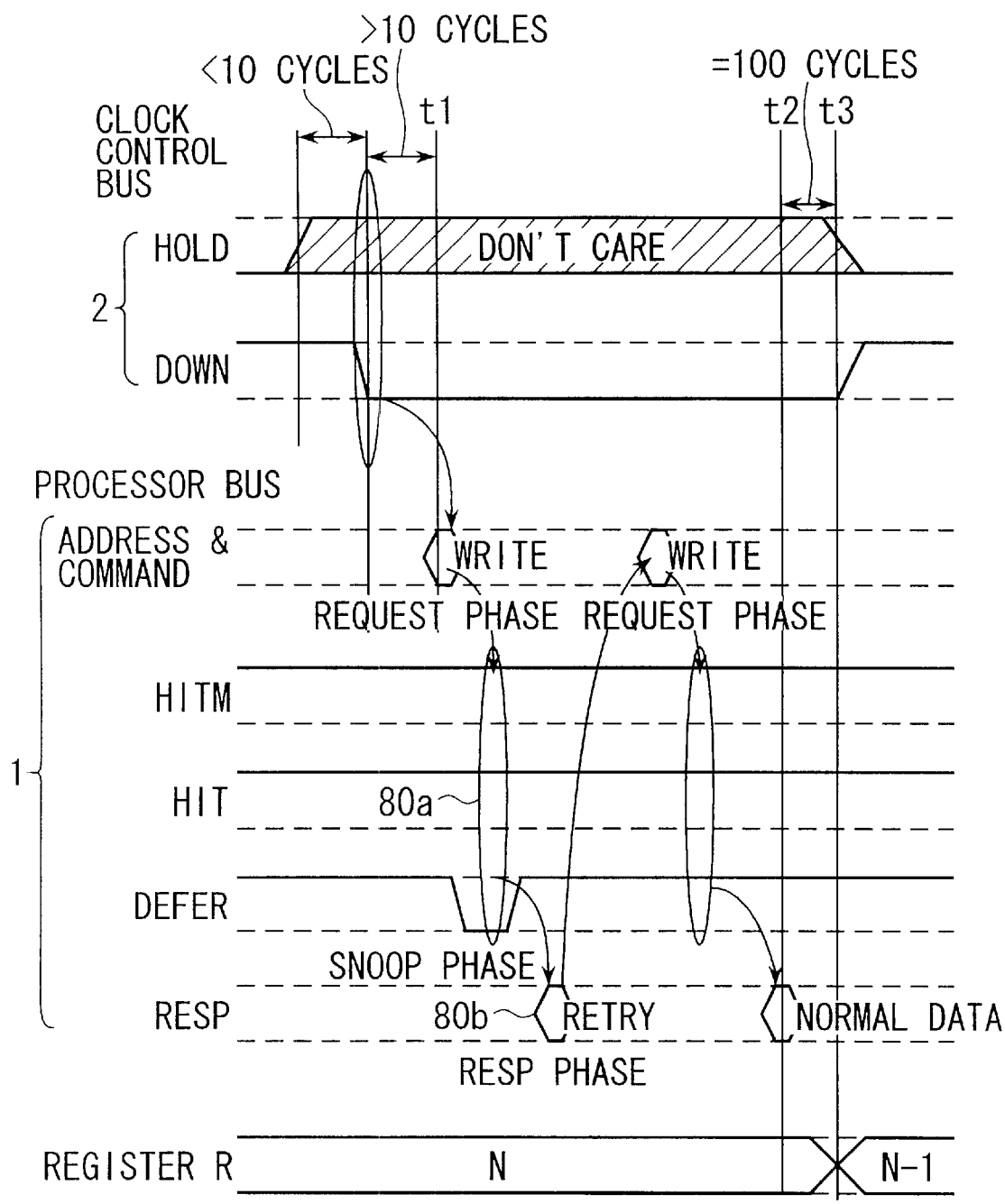
FIG. 8 is a timing chart obtained when a target LSI (memory controller 60) retries in the first embodiment.
Figure 9:
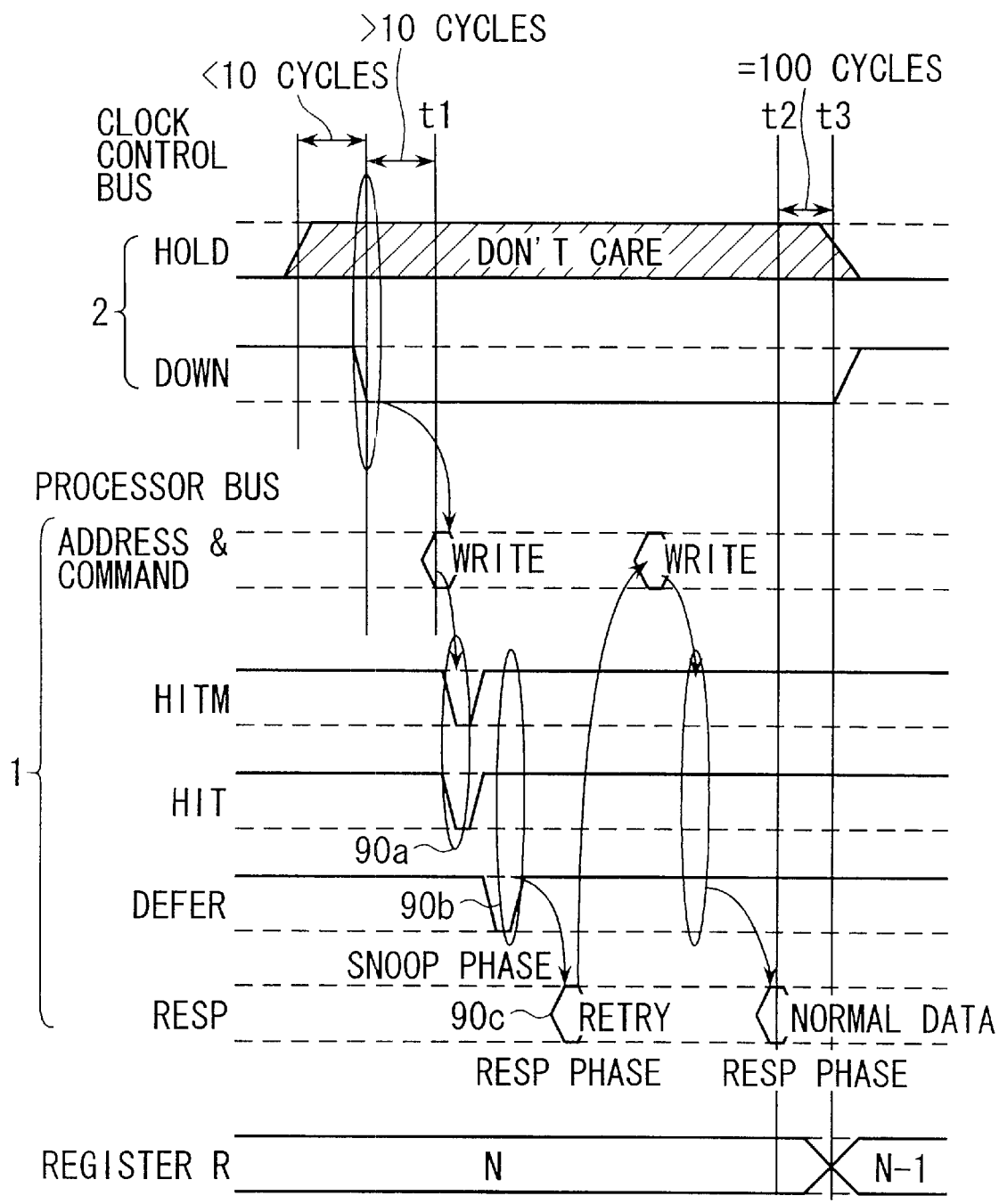
FIG. 9 is a timing chart obtained when another LSI except for the LSI of a master processor 3 and a target LSI make a target LSI (memory controller 60) retry in the first embodiment.
Figure 10:
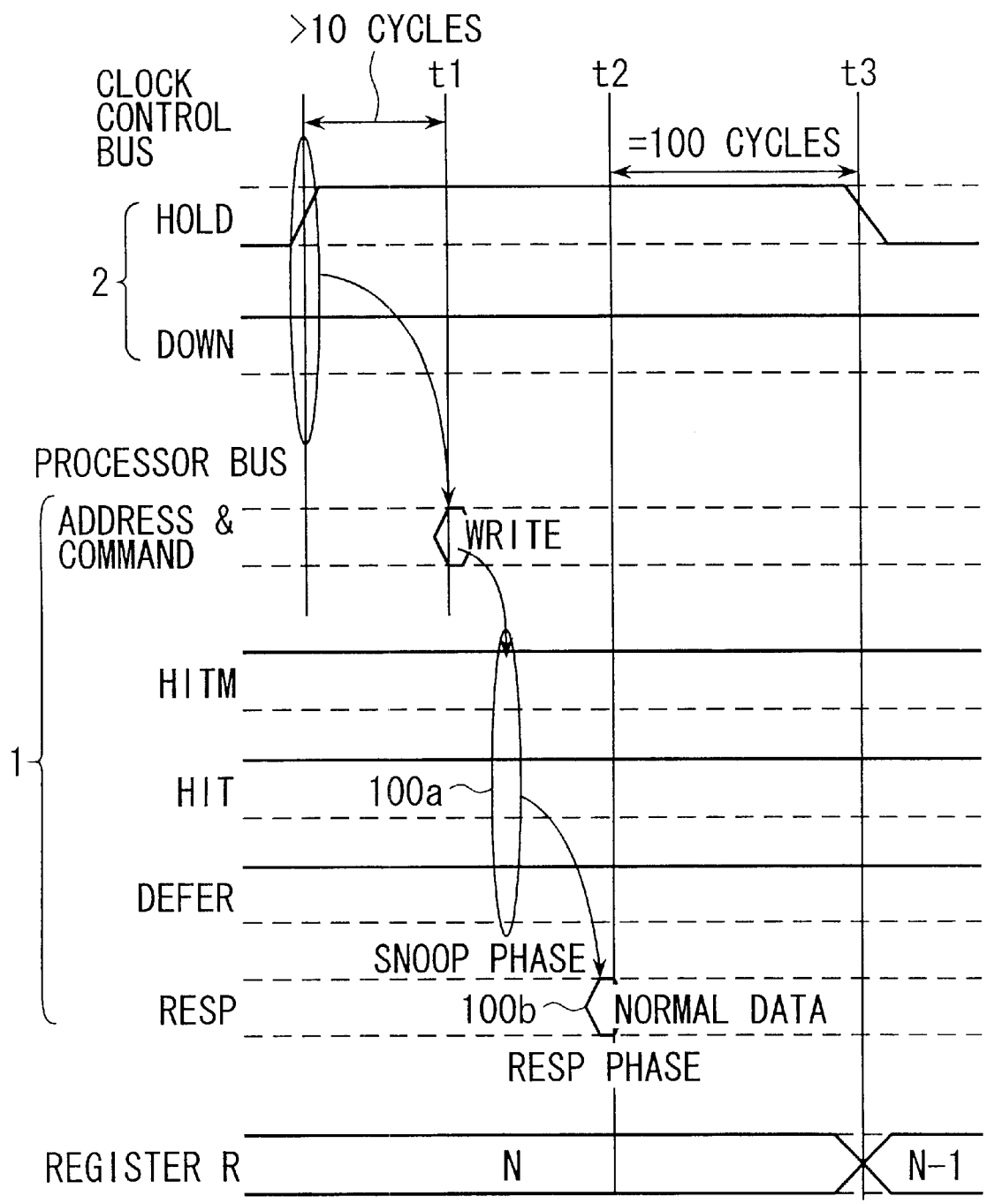
FIG. 10 is a timing chart obtained when retry is not performed to a bus transaction for clock frequency changing in the first embodiment.
Figure 11:
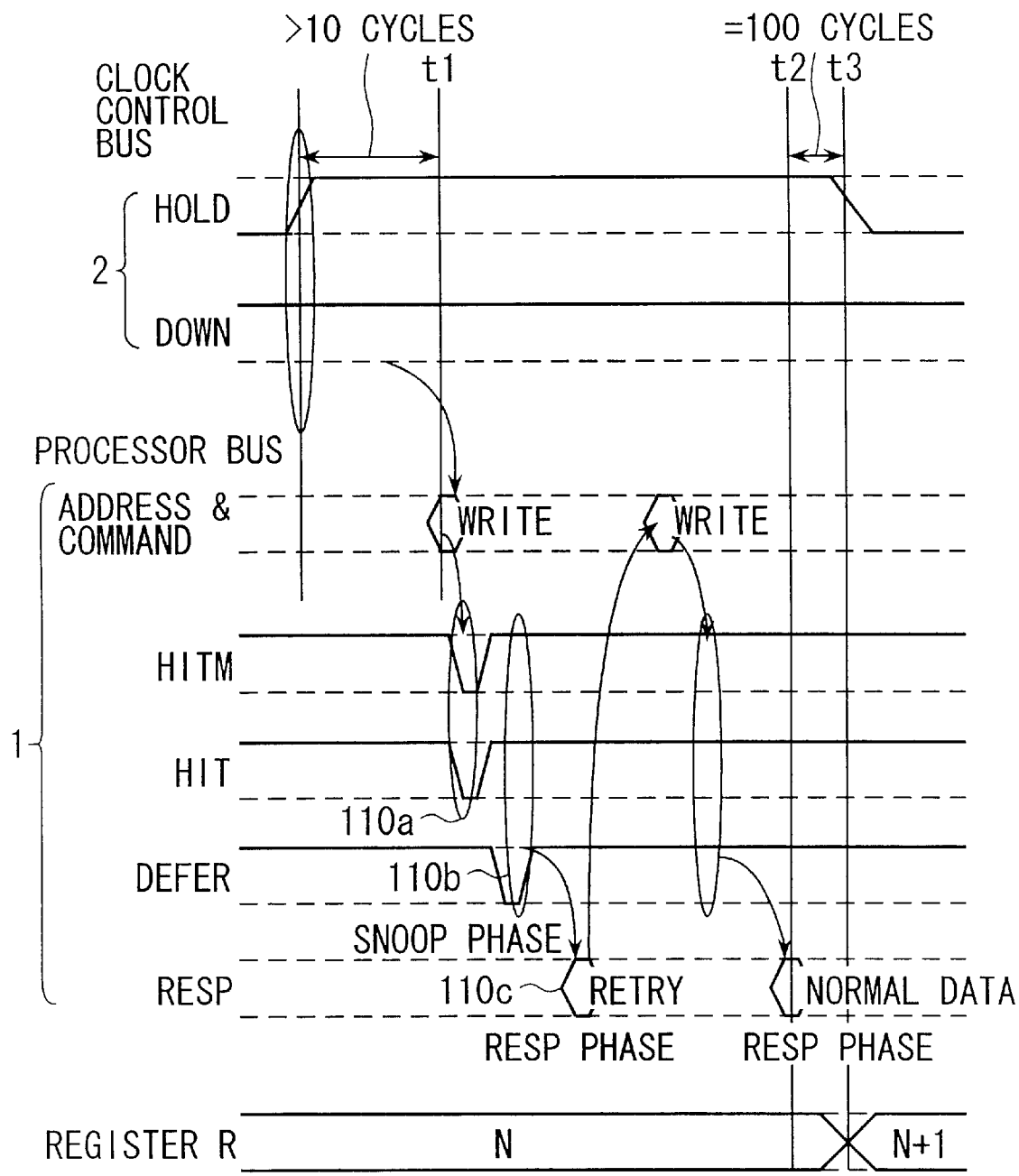
FIG. 11 is a timing chart obtained when a target LSI (memory controller 60) retries in the first embodiment.

FIG. 4 is a flow chart for explaining a clock frequency changing operation in the processor 3, FIG. 5 is a flow chart for explaining a clock frequency changing operation of a target LSI (in this case, the memory controller 60 of the host-PCI bridge 6) serving as a target of a bus transaction performed by the processor 3, and FIG. 6 is a flow chart for explaining a clock frequency changing operation of another LSI except for the LSI of the processor 3 and the target LSI. FIGS. 7 to 9 are timing charts obtained when clock frequencies are decreased, in which: FIG. 7 shows a case in which retry is not performed to a bus transaction for clock frequency changing; FIG. 8 shows a case in which the target LSI (memory controller 60) retries; and FIG. 9 shows a case in which another LSI except for the LSI of the master processor 3 and the target LSI make the target LSI (memory controller 60) retry. FIGS. 10 and 11 are timing charts obtained when clock frequencies are increased, in which: FIG. 10 shows a case in which retry is not performed to a bus transaction for clock frequency changing; and FIG. 11 shows a case in which the target LSI (memory controller 60) retries.

In this embodiment, as the processor bus 1, a PentiumPro bus used in a PentiumPro processor or the like available from Intel Corporation in the U.S.A. is applied. PentiumPro bus protocol requires are and only bus transaction target to each address. Normally, memory controller 60 becomes the target device. As typical signals of the PentiumPro bus, the following signal groups are known:

bus request signal group
which is an arbitration signal group for obtaining the usage right of the bus;

address signal group
which is a signal group representing a target address to be read/written;

request signal group
which is a signal group representing the type of a bus transaction, "read", "write", or the like being used as the bus transaction; and snoop signal group
which is a signal group for keeping cache coherency. As the snoop signal, a HIT signal, a HITM signal, and a DEFER signal are known. The HIT signal represents that cache memories are set in a SHARED state (the contents of the cache memories are equal to the information in the main memory 9). The HITM signal represents that any one of the cache memories is set in a MODIFIED state (the contents of the cache memories are updated not to equal to the information in the main memory 9). The DEFER signal represents that the target is retried or deferred (delayed). The transaction is aborted by the retry, and the transaction is executed again later by the deferring.

response signal group
which represents transmission of read data, retry, or the like, and completes a bus transaction.

The bus transaction on the PentiumPro bus has the following phases:

request phase for outputting an address or the like;

snoop phase for performing notification of a cache state; and response phase for completing the bus transaction.

In order to retry the bus transaction on the PentiumPro bus, the following procedures are performed:

(1) the DEFER signal is asserted in the snoop phase; and (2) a retry response is returned in the response phase.

In the bus architecture of the PentiumPro bus, only a bus agent serving as a target can retry the bus transaction. The bus agent serving as the target is generally a memory controller or a PCI bus bridge. In this embodiment, the bus agent is the memory controller 60 on the host-PCI bridge 6.

The order of descending priorities of the signals used in the snoop phase is given by: HITM→DEFER→HIT. When the HIT signal and the HITM signal are simultaneously asserted, the snoop phase is elongated. After two clock cycles, the snoop phase is executed again.

As shown in FIG. 4, a processor serving as a master for a clock frequency changing operation, e.g., the master processor 3 determines to decrease the clock frequency regardless of the state of the HOLD signal when a state in which the DOWN signal on the clock control bus 2 is asserted (i.e., a state representing that the clock signal must be decreased) continues by 10 or more clock cycles (FIGS. 7 to 9). The master processor 3 determines to increase the clock frequency when a state in which both the HOLD signal and the DOWN signal on the clock control bus 2 are asserted (i.e., a state representing that the clock frequency must be increased) by 10 or more clock cycles (FIGS. 10 and 11).

When the master processor 3 determines that the clock frequency must be changed (step S1), the master processor 3 asserts a "bus request" signal on the processor bus 1 to request the usage right of the processor bus 1 (from a bus arbiter (not shown)) (step S2).

If the master processor 3 acquires the usage right of the processor bus 1 (YES at step S3), the master processor 3 issues a write transaction for a predetermined address "A" to change a clock frequency (at a point of time t1 in FIGS. 7 to 10) (step S4). In this embodiment, the target of the bus transaction is the memory controller 60 of the host-PCI bridge 6.

A target LSI (target device), i.e., the memory controller 60 of the host-PCI bridge 6 on the processor bus 1, as shown in FIG. 5, determines at step S12 whether the clock frequency changing operation can be performed or not at present when the bus transaction for clock frequency changing to the target LSI itself, i.e., a write transaction for the address "A" is generated (YES at step S11).

If the clock frequency can be changed, the memory controller 60 determines at step S13 whether both the signals, i.e., the HIT signal and the HITM signal on the clock control bus 2 are asserted or not (by another LSI which cannot change the clock frequency at step S28 (to be described later)), i.e., whether an LSI which cannot change the clock frequency exists or not (step S13).

If both the signals, i.e., the HIT signal and the HITM signal are not asserted as in states 70a and 100a in FIGS. 7 and 10 (NO at step S13), the memory controller 60 determines that an LSI which cannot change the clock frequency does not exist, therefore, that the clock frequency may be changed. In this case, the memory controller 60 executes a bus transaction, from the master processor 3, for changing a clock frequency, and returns a "normal" response to the master processor 3 by a response signal in the response phase as in states 70b and 100b in FIGS. 7 and 10 to complete the bus transaction (step S14).

When the memory controller 60 waits until a predetermined number of clock cycles, e.g., 100 cycles elapse from a point of time t2 at which a bus transaction (write transaction) is completed (i.e., reaches a point of time t3 in FIGS. 7 and 10)(YES at step S15), and changes a value "N" of the frequency setting register R in its own clock generation circuit CG by only 1 (decreased by only 1 in the example in FIG. 7 and increased by only 1 in the example in FIG. 10). In this manner, the moment the clock frequency is changed by a predetermined amount, the memory controller 60 deasserts the DOWN signal and asserts the HOLD signal (step S16). It is determined at step S17 that a clock frequency changing operation is synchronized with the changes of the DOWN signal and the HOLD signal. If it is not determined, an alarm or the like is generated.

In contrast to this, as in states 90a and 110a in FIGS. 9 and 11, if both the signals, i.e., the HIT signal and the HITM signal are asserted (YES at step S13), the memory controller 60 determines that an LSI which cannot change the clock frequency exists, therefore, the clock frequency may not be changed. In this case, the memory controller 60, as shown in the examples in FIGS. 9 and 11, asserts the DEFER signal in snoop phases 90b and 110b after two clock cycles (step S18), returns a retry response to the master processor 3 in response phases 90c and 10c (step S19), and waits at step S11 until a bus transaction for clock frequency changing is reissued from the master processor 3.

When the memory controller 60 cannot change the clock frequency because the memory controller 60 accesses the main memory 9 (NO at step S12), as in the example in FIG. 8, the DEFER signal is asserted in a snoop phase 80a (step S18), a retry response is returned in the response phases 80b (step S19), and thereafter, the memory controller 60 returns to step S11.

Similarly, of the LSI except for the LSI of the master processor 3, an LSI (in this case, the processors 4 and 5 and the other devices 7) except for the target LSI (memory controller 60) determines at step S22 whether or not a clock frequency changing operation can be performed at present when the bus transaction for clock frequency changing is detected as shown in FIG. 6 (step S21).

Of the LSIs except for the LSI of the master processor 3, LSIs (to be referred to as non-master/non-target LSIs hereinafter) except for the target LSI (memory controller 60) determine at step S23 whether or not both the signals, i.e., the HIT signal and the HITM signal on the clock control bus 2 are asserted by another LSI if the clock frequency of the LSIs can be changed (step S23).

If both the signals, i.e., the HIT signal and the HITM signal are not asserted as in the states 70a and 100a in FIGS. 7 and 10 (NO at step S23), the non-master/non-target LSIs determine that an LSI which can change the clock frequency does not exist, therefore, the clock frequency may be changed. In this case, the non-master/non-target LSIs, as in the states 70b and 100b in FIGS. 7 and 10, wait until a response signal is returned from the target LSI (memory controller 60) to the master processor 3 in the response phase, i.e., wait until the bus transaction is completed.

When the non-master/non-target LSIs monitor the processor bus 1 and detect that the response signal is returned in the response phase, the non-master/non-target LSIs determine whether the response signal is a "normal" response signal or a retry response signal (step S24).

If the response signal is the "normal" response signal (YES at step S24), the non-master/non-target LSIs determine that the bus transaction is normally completed, and wait until 100 cycles elapse from a point of time t2 (i.e., reaches the point of time t3 in FIGS. 7 and 10) (step S25). Each of the non-master/non-target LSIs changes the value "N" of the frequency setting register R in the clock generation circuit CG by only 1 (decreased by only 1 in the example in FIG. 7, and increased by only 1 in the example in FIG. 10), so that the non-master/non-target LSIs change the clock frequency and, at the same time, deassert the DOWN signal and assert the HOLD signal (step S26). At step S27, the non-master/non-target LSIs determine that the clock frequency changing operation is reliably synchronized with the changes of the DOWN signal and the HOLD signal. If it is not determined at step S27, an alarm or the like is generated.

In contrast to this, as in the states 90a and 110a in FIGS. 9 and 11, if both the signals, i.e., the HIT signal and the HITM signal on the processor bus 1 are asserted (YES at step S23), the non-master/non-target LSIs determine that an LSI which cannot change the clock frequency exists, therefore, the clock frequency may not be changed. In this case, the non-master/non-target LSIs return to step S21 to wait until retry of a bus transaction for clock frequency changing is performed.

Similarly, also when the non-master/non-target LSIs return a retry response from the target LSI (memory controller 60) to the master processor 3 as in the state in FIG. 8 (response phase 80b) (NO at step S24), the non-master/non-target LSIs return to step S21 to wait until the retry of the bus transaction for clock frequency changing is performed.

In addition, when the non-master/non-target LSIs cannot change own clock frequency (NO at step S22), both the signals, i.e., the HIT signal and the HITM signal are asserted (step S28) as in the examples in FIGS. 9 and 10. Thereafter, the non-master/non-target LSIs return to step S21 to wait until the bus transaction for clock frequency changing is performed.

Returning to FIG. 4, the master processor 3 which issues the bus transaction for clock frequency changing monitors whether or not a retry response is returned in a response phase, from the target LSI (memory controller 60), for the transaction (step S5).

If a "normal" response is returned (NO at step S5), the master processor 3 determines completion of the bus transaction (step S6), and waits until 100 cycles elapse from the point of time t2 (i.e., reaches the point of time t3 in FIGS. 7 and 10) (step S7). The master processor 3 changes the value "N" of the frequency setting register R in the clock generation circuit CG of each of the non-master/non-target LSIs by only 1 (decreased by only 1 in the example in FIG. 7, and increased by only 1 in the example in FIG. 10), so that the master processor 3 changes the clock frequency and, at the same time, deasserts the DOWN signal and asserts the HOLD signal (step S8). In step S9, the master processor 3 determines that the clock frequency changing operation is reliably synchronized with the changes of the DOWN signal and the HOLD signal. If it is not determined, an alarm or the like is generated.

In contrast to this, as in the response phases 80b, 90c, and 110c in FIGS. 8, 9, and 11, if a retry response is returned (YES at step S5), the master processor 3 executes steps S1 to S4 again, and issues a bus transaction for clock frequency changing to the processor bus 1 again. If all the target LSI (memory controller 60) and the non-master/non-target LSIs can change the clock frequencies in the reissue of the bus transaction, i.e., retry, as in the examples in FIGS. 8, 9, and 11, a "normal" response is returned from the target LSI (memory controller 60) at the point of time t2, the master processor 3 waits until 100 cycles elapse from the point of time t2 (i.e., reaches the point of time t3 in FIGS. 8, 9, and 11) to change the value "N" of the frequency setting register R in the clock generation circuit CG of the master processor 3 by only 1 (decreased by only 1 in the example in FIGS. 8 and 9, and increased by only 1 in the example in FIG. 11), so that the master processor 3 also changes the clock frequency.

As described above, in this embodiment, when the target LSI (memory controller 60) and the non-master/non-target LSI cannot change the clock frequencies, the master processor 3 retries the bus transaction. The mechanism of the retry will be orderly described below.

(a) When the memory controller 60 (target LSI) cannot change the clock frequency (NO at step S12), the memory controller 60 asserts a DEFER in a snoop phase (step S18), and retries in a response phase (step S19).

(b) Even though the memory controller 60 (target LSI) can change the clock frequency, when other LSIs (non-master/non-target LSIs) cannot change the clock frequency, the non-master/non-target LSIs simultaneously assert the HIT signals and the HITM signals in the snoop phase (step S28). For this reason, this is monitored by the memory controller 60 itself (YES at step S13), the DEFER signal is asserted in a snoop phase after two clock cycles (step S18), and retry is performed in the response phase (step S19).

(c) When a bus transaction for clock frequency changing is issued from the master processor 3 to the memory controller 60 (target LSI) (step S21), if the non-master/non-target LSIs cannot change the clock frequency (NO at step S22), the non-master/non-target LSIs assert the HIT signal as well as the HITM signal in the snoop phase in order to make the memory controller 60 (target LSI) retry the bus transaction for clock frequency changing (step S28). In this case, the memory controller 60 (target LSI) asserts the DEFER signal by the mechanism shown in item (b) in the snoop phase after two clock cycles, and retries the transaction in the response phase.

In this manner, when the bus transaction for clock frequency changing is retried, the LSIs (the master processor 3, the target LSI, and the non-master/non-target LSIs) do not change clock frequencies. In contrast to this, when the bus transaction for clock frequency changing is not retried, each of the LSIs (the master processor 3, the target LSI, and the non-master/non-target LSIs) changes the clock frequencies simultaneously when 100 clock cycles elapse after the transaction is completed, and, at the same time, deasserts the DOWN signal and asserts the HOLD signal to complete the clock frequency changing operation (steps S8, S16, and S26). In addition, it is determined at steps S9, S17, and S27 whether or not the clock frequency changing operations are reliably synchronized with the changes of the DOWN signals and the HOLD signals. If NO at steps S9, S17, and S27, alarms or the like generated.

In the embodiment described above, in consideration that a normal operation may not be secured when the clock frequency is changed while, e.g., the memory controller 60 accesses the main memory 9, the retry mechanism for a bus transaction for clock frequency changing is arranged. However, if it is secured that erroneous operations are not performed when the LSIs change the clock frequency, the retry mechanism is not necessarily required.

In this embodiment, the system monitor LSI 11 serving as the master of the serial bus 10 can periodically or occasionally issue a bus transaction onto the serial bus 10, and can read the values of the frequency setting registers R of the LSIs 3 to 7. The serial bus 10 compares the values of the frequency setting registers R of the LSIs 3 to 7 with each other (for example, the set value of the master processor 3 is compared with the set values of the other LSIs). If some value is different from the other values, abnormality is detected. In this manner, it is secured that the clock frequency setting states in the LSIs 3 to 7 are matched with each other in the entire system.

In the embodiment described above, a clock frequency changing transaction, issued from the master processor 3 onto the processor bus 1, for the target LSI (memory controller 60), i.e., a write transaction, for an address "A", for performing clock frequency changing operations of the LSIs in synchronism with each other does not designate directions of the frequency changing operations. In the embodiment, the LSIs determine the frequency changing directions on the basis of the combinations of the HOLD signal and the DOWN signal on the clock control bus 2. However, the present invention is not limited to the embodiment. For example, two types of bus transactions, i.e., a write transaction for the address "A" and a write transaction for an address "A'" may be prepared. One transaction may apparently designate a decrease of the clock frequency, and the other transaction may apparently designate an increase of the clock frequency.

The following configuration may be used. Write transactions for addresses B and B, are added in dependently of the write transactions for the addresses A and A' to designate different amounts of clock frequency changing. For example, one transaction may change the values of the frequency setting registers R by only 1, and the other transaction may change the values of the frequency setting registers R by only 2.

In addition to the HOLD signal and the DOWN signal, an UP signal representing an increase of the clock signal can be prepared. In this case, although the structure of the clock control bus 2 is slightly complex, it can be apparently designated by only the UP signal that the clock frequency must be increased. For this reason, control is easily performed.

Second Embodiment

The second embodiment of the present invention will be described below by conveniently using the configuration of FIG. 1.

The characteristic feature of this embodiment is as follows. That is, a master for changing a clock frequency does not exist, and respective LSIs change the clock frequency according to the same algorithm. Here, clocks used in the LSIs 3 to 7 have speeds lower than the speed of the clock control bus 2, or the speed of the clock control bus 2 is sufficiently higher than that of each clock.

When the clock control bus 2 has a speed which is sufficiently higher than that of the clock frequency, as will be described below, the clock frequency can be changed at a timing at which a signal on the clock control bus 2 is deasserted.

The signals on the clock control bus 2 are the same as those in the first embodiment, and are two types of signals, i.e., the HOLD signal and the DOWN signal. In this embodiment, as present clock states, in addition to three types of states, i.e., "clock frequency is excessively high", "present clock is optimum", and "clock frequency can be increased", a state "clock frequency changing is prohibited" is newly defined.

FIG. 12 shows the relationship between present clock states applied in the second embodiment and combination output contents of the HOLD signal and the DOWN signal. The second embodiment is different from the first embodiment in that, in a state "clock frequency changing is prohibited", each of the LSIs (the processors 3 to 5, the host-PCI bridge 6, and the other devices 7) asserts the HOLD signal and the DOWN signal.

As in the first embodiment, the LSIs prepare to change the clock frequency by the combinations of the HOLD signal and the DOWN signal. The relationship between the combinations of the HOLD signal and the DOWN signal and the clock changing operation contents (next clock states) of the LSIs is shown in FIG. 13. FIG. 13 is different from FIG. 3 in the first embodiment in that a state in which both the HOLD signal and the DOWN signal are asserted is not defined as a state in which preparation for "clock frequency is decreased" is started, but is redefined as a state "completion of preparation for clock frequency changing".

In this embodiment, a clock frequency changing operation is performed once 200 clock cycles at most.

Clock frequency changing operations in the LSIs according to the embodiment will be appropriately described below with reference to FIGS. 14 to 23.

Figure 19:
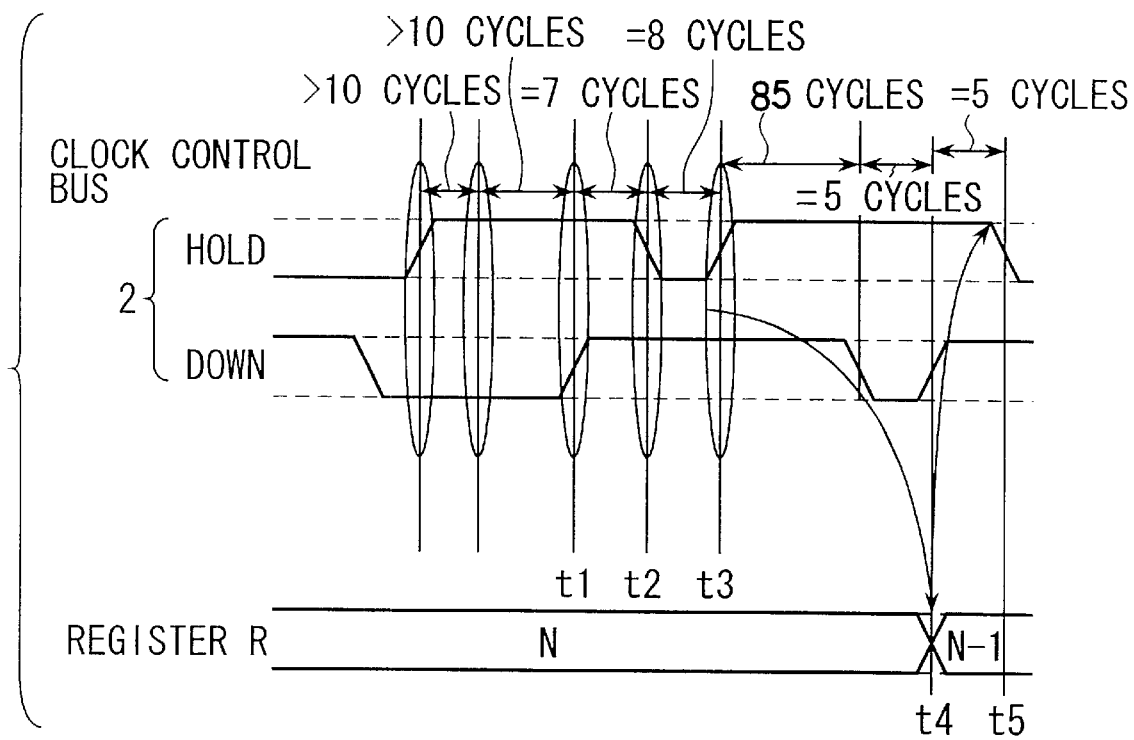
FIG. 19 is a timing chart obtained when a clock frequency changing operation for decreasing a clock frequency is performed at a timing which is not delayed in the second embodiment.
Figure 20:
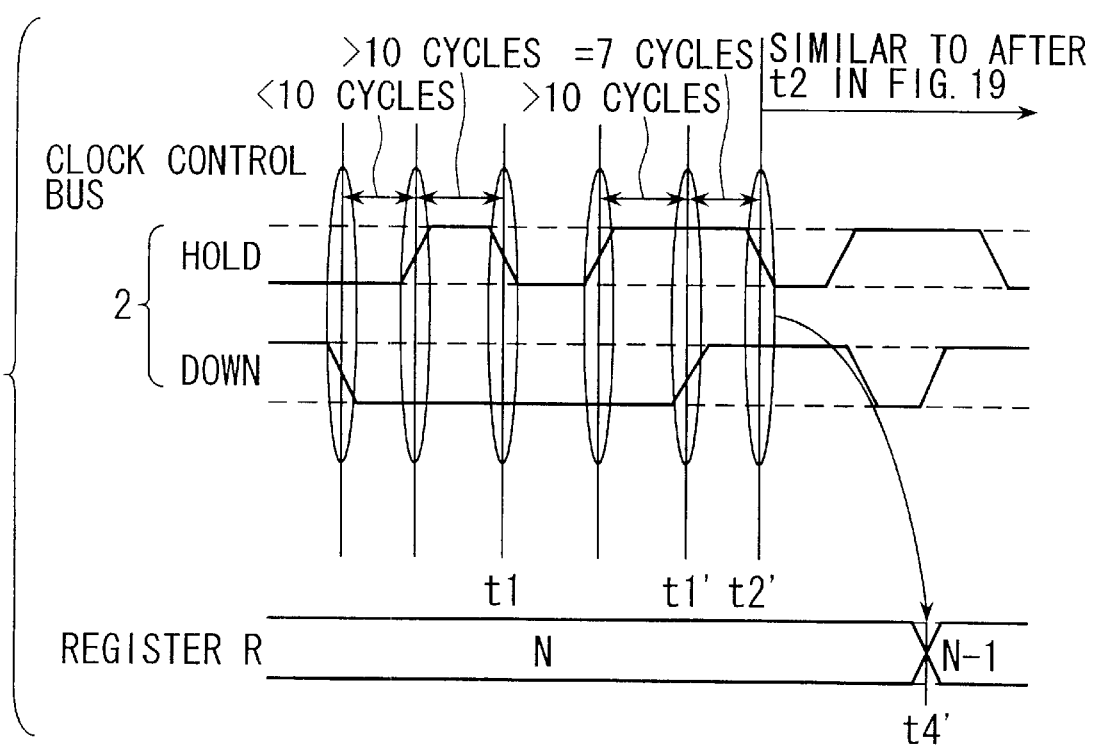
FIG. 20 is a timing chart obtained when a clock frequency changing operation for decreasing a clock frequency is performed at a timing which is delayed in the second embodiment.
Figure 21:
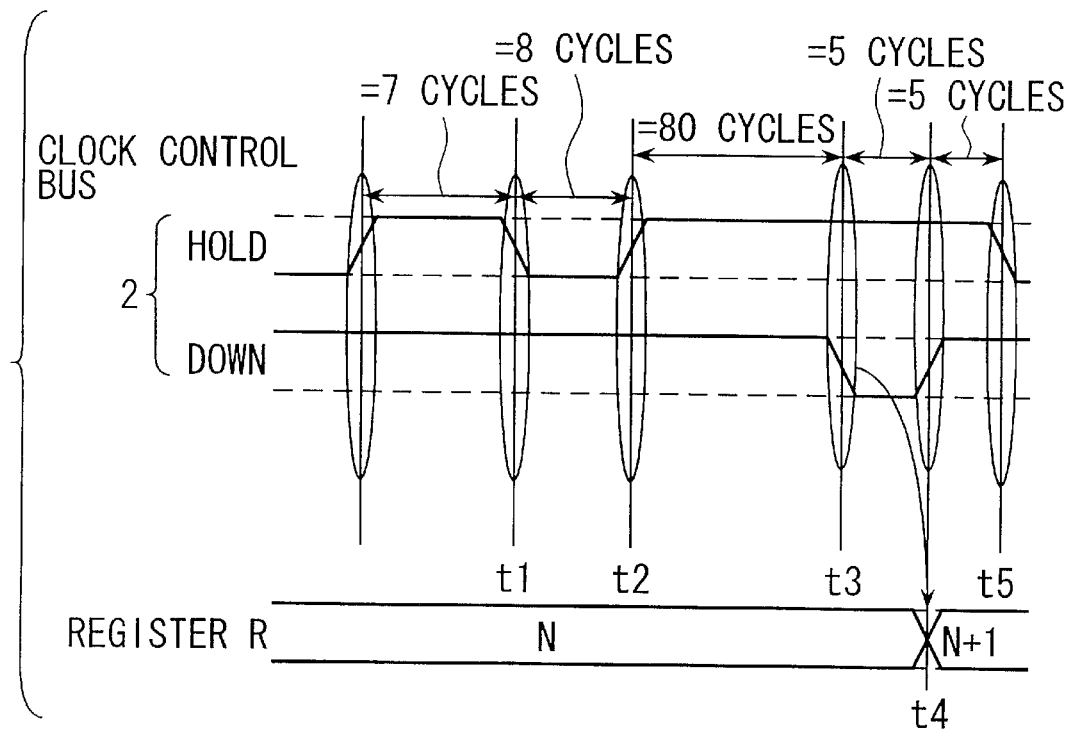
FIG. 21 is a timing chart obtained when a clock frequency changing operation for increasing a clock frequency is performed at a timing which is not delayed in the second embodiment.
Figure 22:
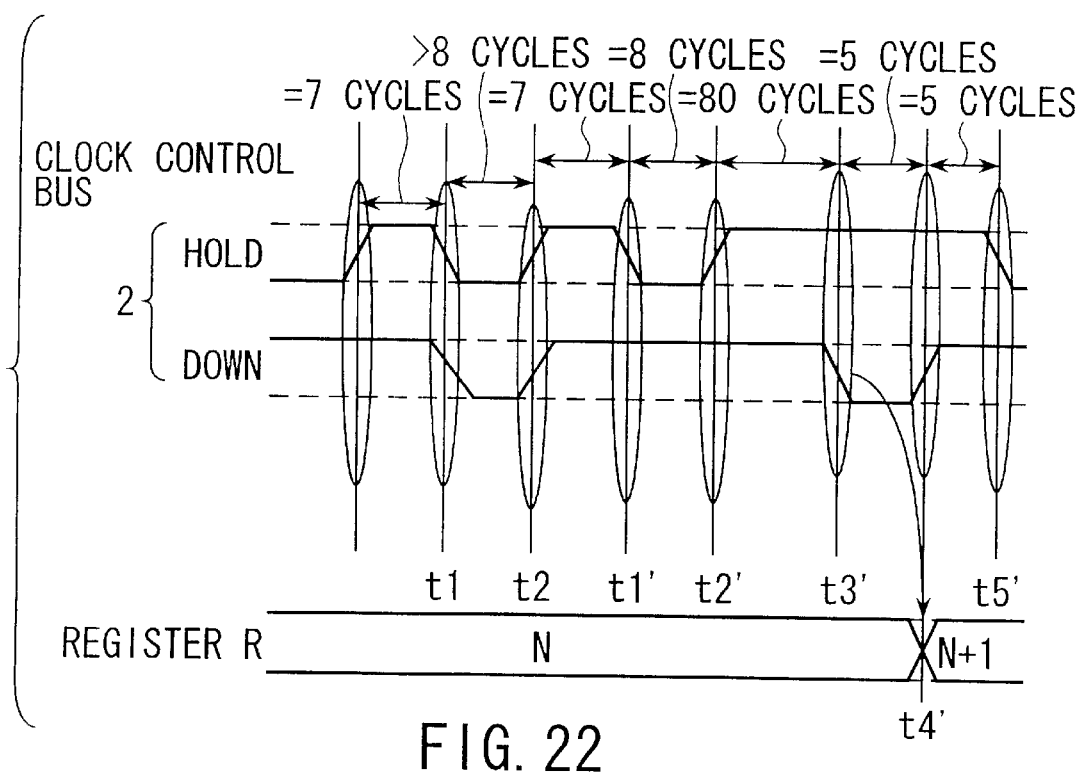
FIG. 22 is a timing chart obtained when a clock frequency changing operation for increasing a clock frequency is performed at a timing which is delayed in the second embodiment.
Figure 23:
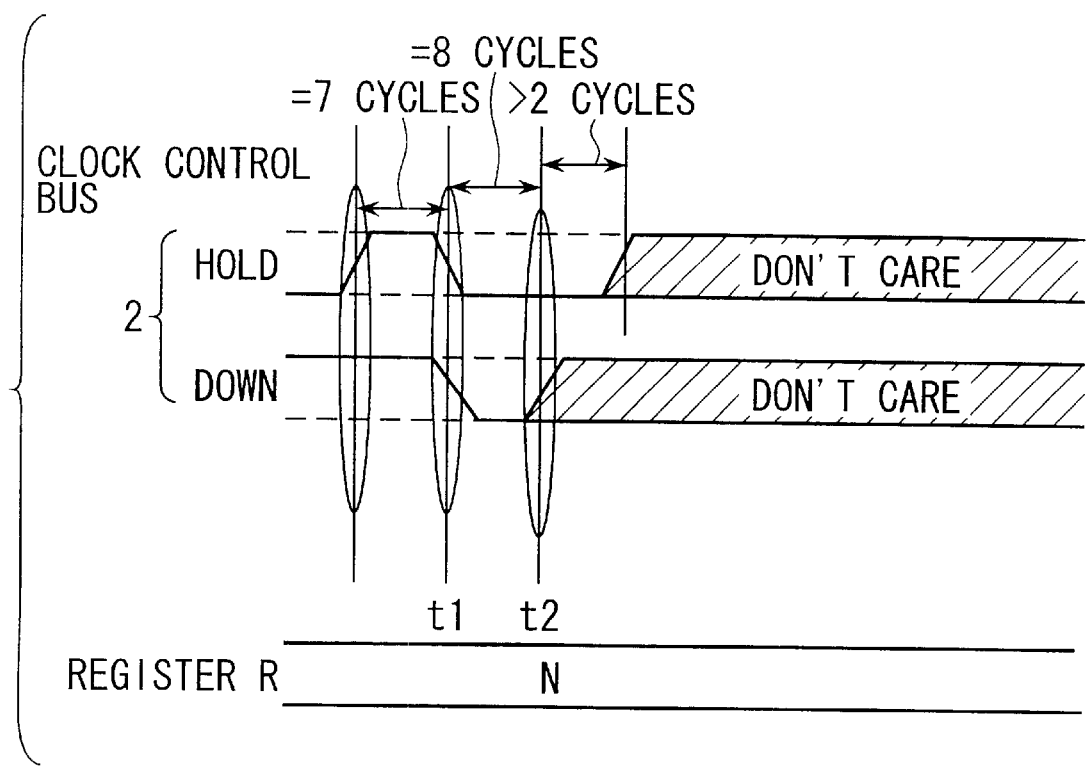
FIG. 23 is a timing chart obtained when a clock frequency changing operation for increasing a clock frequency is stopped in the second embodiment.

FIGS. 14 to 18 are flow charts for explaining clock frequency changing operations in the LSIs. FIGS. 19 and 20 are timing charts showing a decrease of the clock frequency, in which FIG. 19 shows a case in which a clock frequency changing operation is performed at a timing which is not delayed; and FIG. 20 shows a case in which a clock frequency changing operation is performed at a timing which is delayed. FIGS. 21 to 23 are timing charts showing an increase of the clock frequency, in which FIG. 21 shows a case in which a clock frequency changing operation is performed at a timing which is not delayed; FIG. 22 shows a case in which a clock frequency changing operation is performed at a timing which is delayed; and FIG. 23 shows a case in which a clock frequency changing operation is stopped.

<Case in Which Clock Frequency is Decreased>

Figure 14:
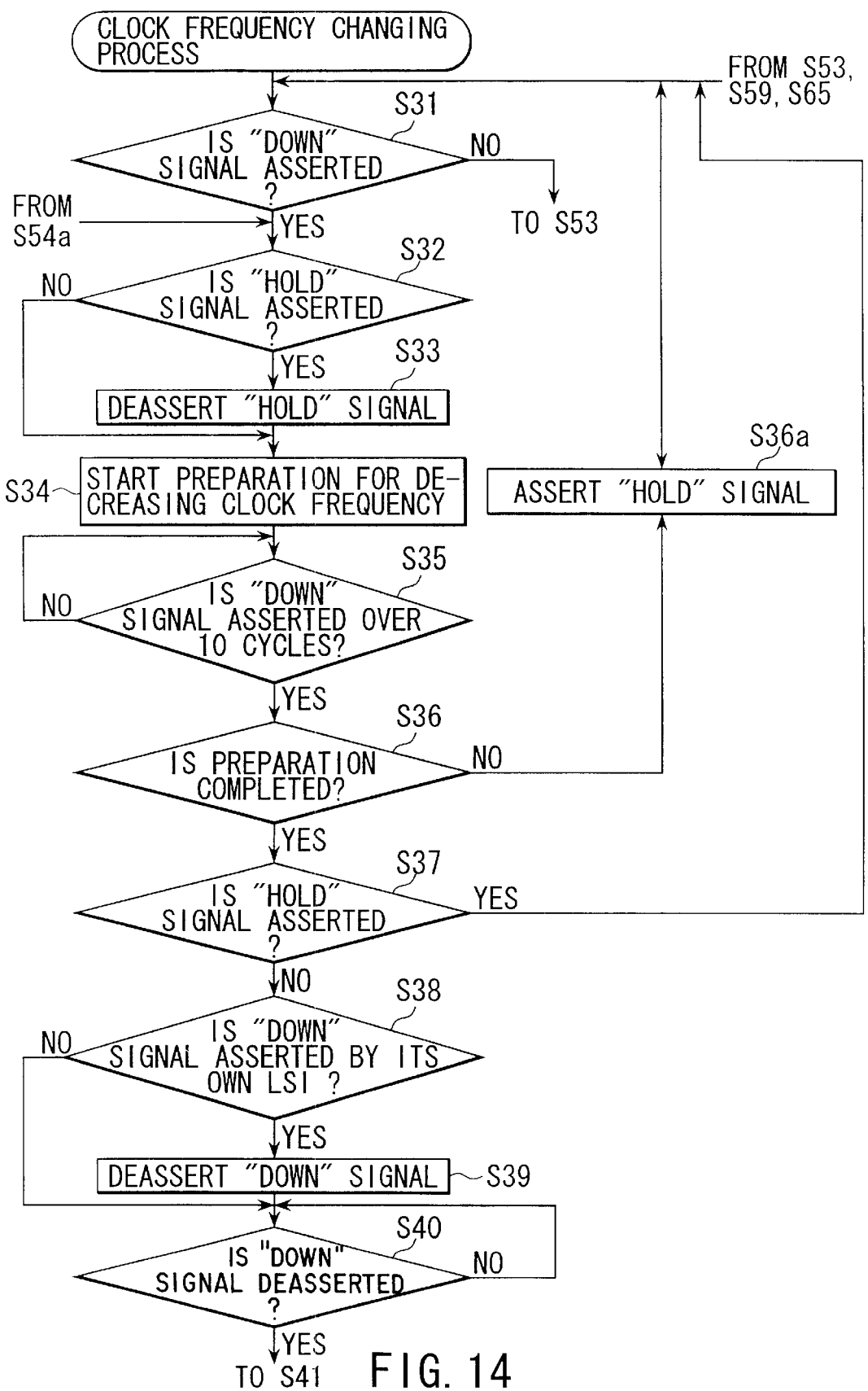
FIG. 14 shows a part of a flow chart for explaining a clock frequency changing operation of each LSI in the second embodiment.
Figure 15:
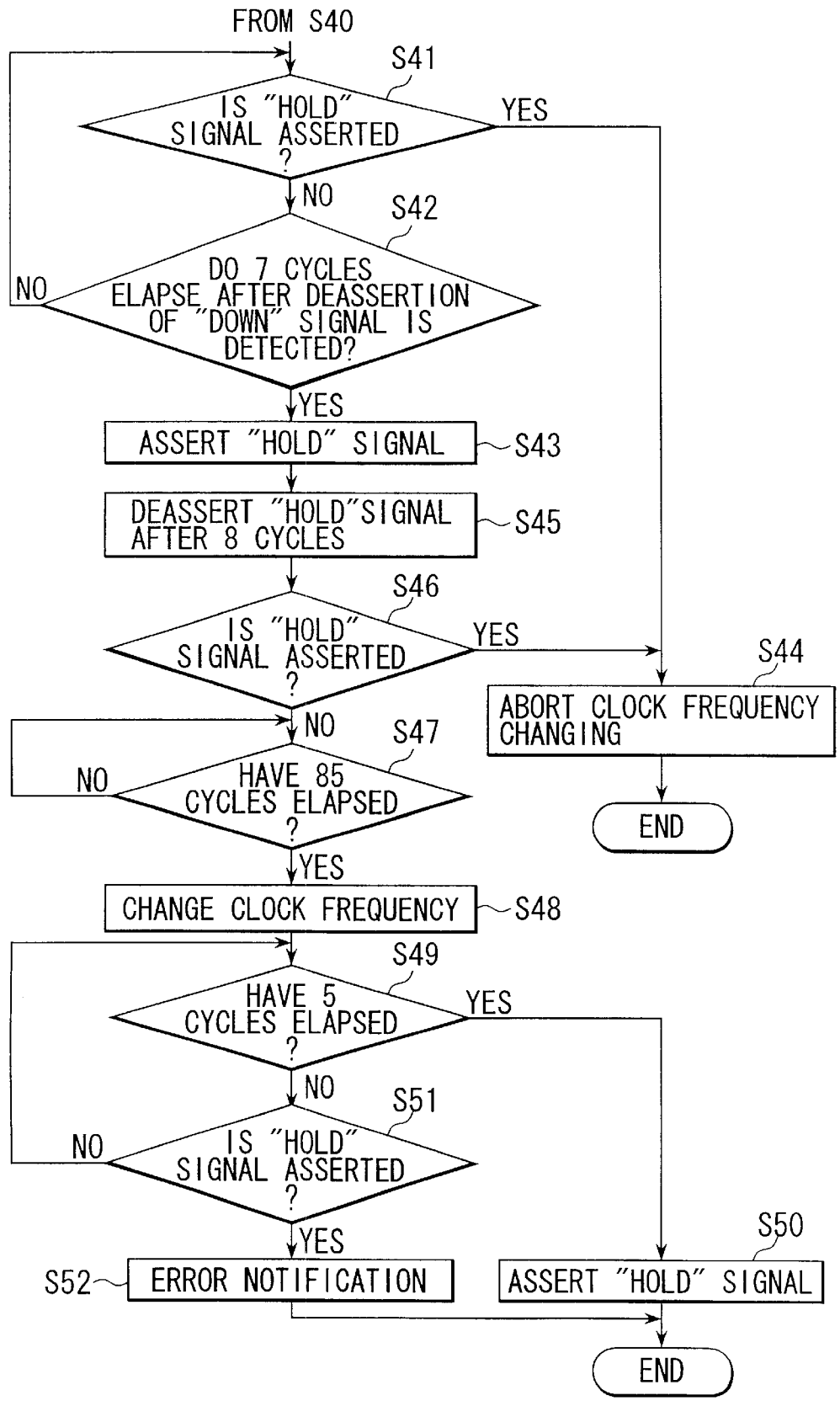
FIG. 15 shows another part of the flow chart for explaining the clock frequency changing operation of each LSI in the second embodiment.

An operation performed when a clock frequency is decreased is as shown in FIGS. 14 and 15.

In the case where it is detected that the DOWN signal on the bus 2 is asserted as shown in FIG. 14 (YES at step S31 in FIG. 14), when the HOLD signal is asserted, the LSIs (to be referred to as LSIs 3 to 7 hereinafter) of the processors 3 to 5, the host-PCI bridge 6, and the other devices 7 which are connected to the clock control bus 2 deassert the HOLD signal (YES at step S32 and step S33) to start preparation for decreasing the clock frequency (step S34). Here, preparation for decreasing a clock frequency is to wait for completion of an operation (process) which may be erroneous by changing the clock frequency and not to newly start such an operation.

When the DOWN signal on the clock control bus 2 is asserted over a predetermined number of clock cycles, i.e., 10 clock cycles (YES at step S35), the LSIs 3 to 7 determine whether preparation for decreasing the clock frequency is completed or not (step S36). If the LSIs 3 to 7 includes an LSI which does not complete the preparation (NO at step S36), the LSI asserts the HOLD signal at time t1 in FIG. 20 (step S36a) to prevent a clock frequency changing operation from being performed, and returns to step S31 to the process of changing the clock frequency again.

In contrast to this, if the preparation is completed (YES at step S36), the LSIs 3 to 7 determine whether or not the HOLD signal is asserted by the other LSIs, i.e., whether or not an LSI which does not complete the preparation exists (step S37). If the HOLD signal is asserted (YES at step S37), the LSIs return to step S31 to perform the process of changing the clock frequency again.

On the other hand, when the preparation is completed in all the LSIs 3 to 7, and when the HOLD signal is not asserted (NO at step S37), of the LSIs 3 to 7, an LSI which asserts the DOWN signal deasserts the DOWN signal at the time t1 in FIG. 19 (YES at step S38, S39).

Here, it is assumed that all the LSIs 3 to 7 complete the preparations for decreasing clock frequencies. In this case, when the LSIs 3 to 7 detect that the DOWN signal on the clock control bus 2 is deasserted (YES at step S40), the LSIs 3 to 7 assert the HOLD signals simultaneously when predetermined number of clock cycles, e.g., 7 clock cycles elapse (time t2 in FIG. 19) (steps 41 to 43 in FIG. 15). However, when the HOLD signal is asserted by another LSI before 7 clock cycles elapse (YES at step S41 in FIG. 15), the clock changing operations may not be synchronized with each other between the LSIs 3 to 7. For this reason, the clock frequency changing operations are aborted, and the processes are ended (step S44).

When the LSIs 3 to 7 can assert the HOLD signals simultaneously (step S43), i.e., can confirm that synchronization between the LSIs 3 to 7 is established, the LSIs 3 to 7 deassert the DOWN signals simultaneously after a predetermined number of clock cycles, e.g., 8 clock cycles elapse (step S45). In this manner, the HOLD signal on the clock control bus 2 is deasserted at the time t3 in FIG. 19. However, when the HOLD signal is kept asserted (YES at step S46), an LSI which deasserts the HOLD signal at a delayed timing exists and the clock frequency changing operations may not be synchronized with each other. For this reason, the clock frequency changing operation is aborted, and the processes are ended (step S44).

As a result obtained when the LSIs 3 to 7 can deassert the HOLD signals simultaneously, when the LSIs 3 to 7 detect that the HOLD signal on the clock control bus 2 is deasserted (NO at step S46), i.e., when it is confirmed that the synchronization between the LSIs 3 to 7 is established, the LSIs 3 to 7 decrease the values N of the frequency setting registers R in the clock generation circuits CG of the LSIs 3 to 7 by 1 at time t4 in FIG. 19 after a predetermined number of clock cycles, e.g., 85 clock cycles elapse (step S47) to change the clock frequencies by predetermined amounts in a descending direction (step S48).

The LSIs 3 to 7 assert the HOLD signals simultaneously when a predetermined number of clock cycles, e.g., 5 clock cycles elapse at time t5 in FIG. 19 after the clock frequencies are changed (YES at step S49), and end the process (step S50). At this time, the LSIs 3 to 7 monitor the HOLD signal on the clock control bus 2 until 5 clock cycles elapse (step S51). If the HOLD signal are asserted before 5 clock cycles elapse (YES at step S51), the LSIs 3 to 7 consider that clock synchronization is not established and that the clock frequency changing operations are failed, the LSIs 3 to 7 notify, e.g., the OS of errors (step S52). Note that the process at step S51, i.e., the process of confirming clock synchronization after the clock frequency changing operations are completed is not necessarily required.

In this manner, in the embodiment, when all the LSIs 3 to 7 detect that the DOWN signal is deasserted (step S40), thereafter, each of the LSIs 3 to 7 changes the clock frequency 100 clock cycles after it is detected that the DOWN signal is deasserted (time t1 in the example in FIG. 19) while confirming that the clock frequency changing operations are synchronized with each other at a predetermined timing.

In contrast to this, when the HOLD signal is asserted not to perform the clock frequency changing operation because synchronization between the LSIs 3 to 7 is not established (YES at step S37), the LSIs 3 to 7 return to step S31 to perform the process of changing the clock frequency again or to abort the clock frequency changing operation. FIG. 20 shows an example in which, because preparation for decreasing the clock frequency is not completed at least one of the LSIs 3 to 7, the HOLD signals are asserted at time t1 to perform the processes for changing the clock frequencies again. Times t1', t2', and t4' in FIG. 20 correspond to time t1, t2, and t4 in FIG. 19, respectively.

<Case in Which Clock Frequency is Increased>

Figure 16:
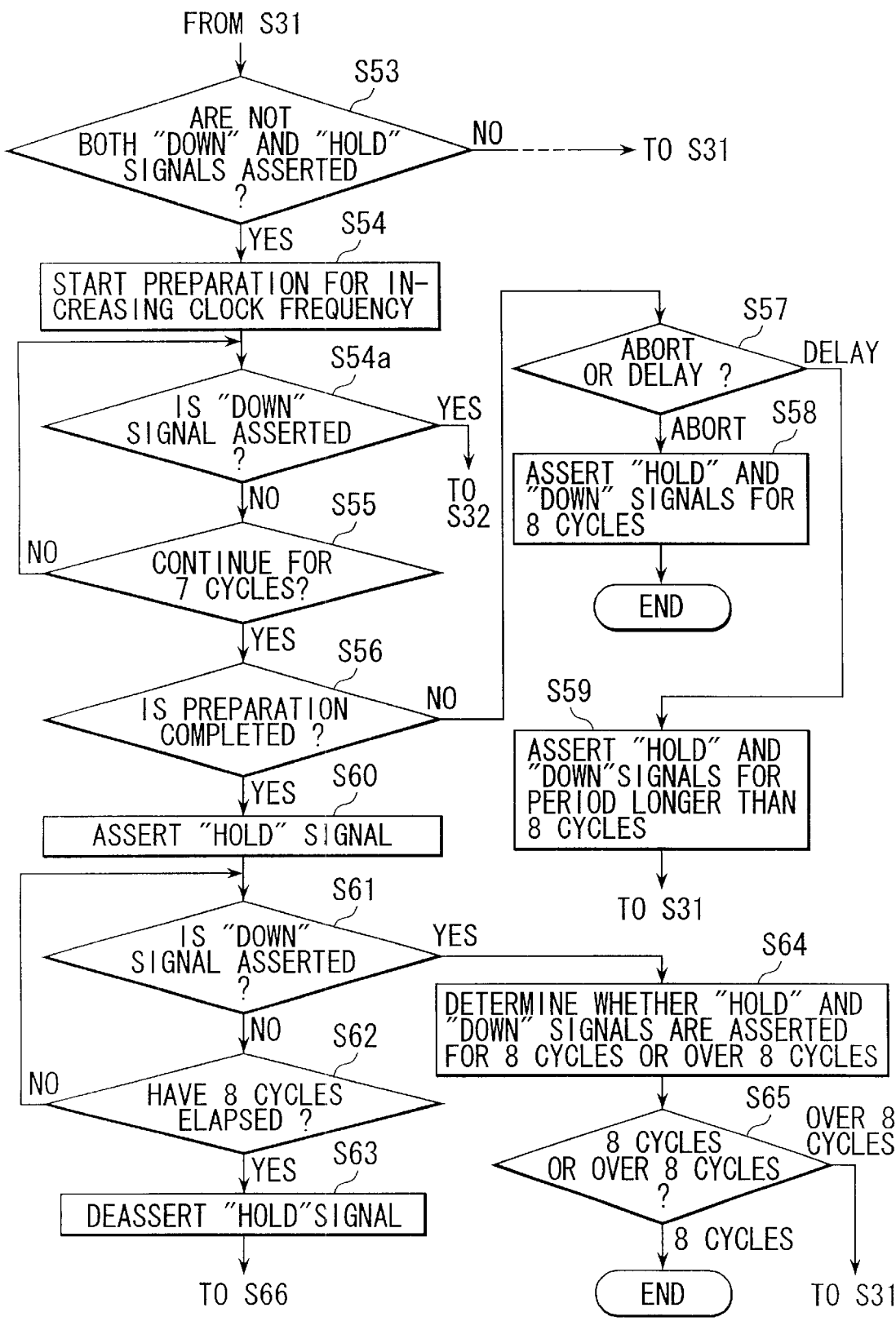
FIG. 16 shows another part of the flow chart for explaining the clock frequency changing operation of each LSI in the second embodiment.
Figure 17:
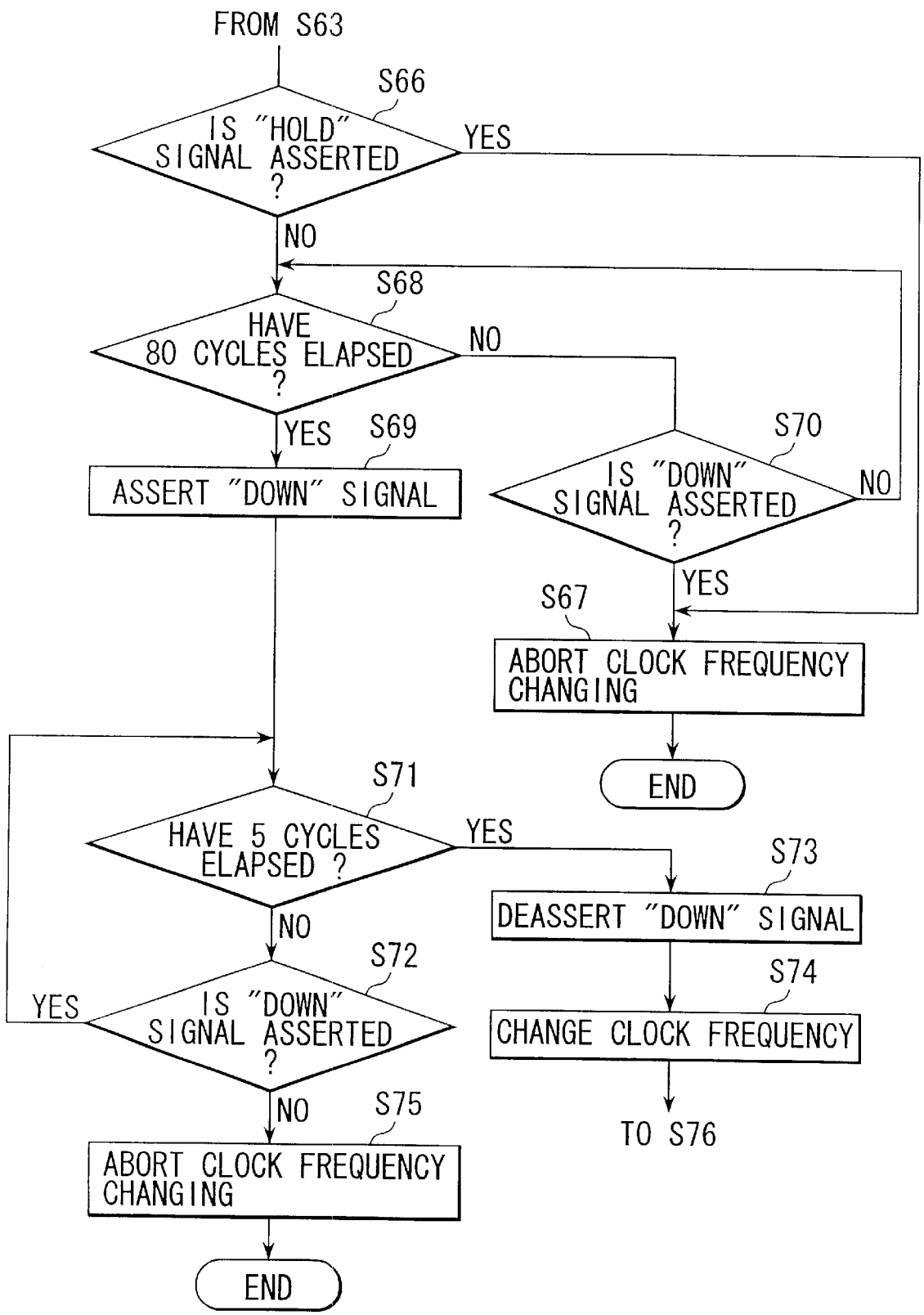
FIG. 17 shows another part of the flow chart for explaining the clock frequency changing operation of each LSI in the second embodiment.
Figure 18:
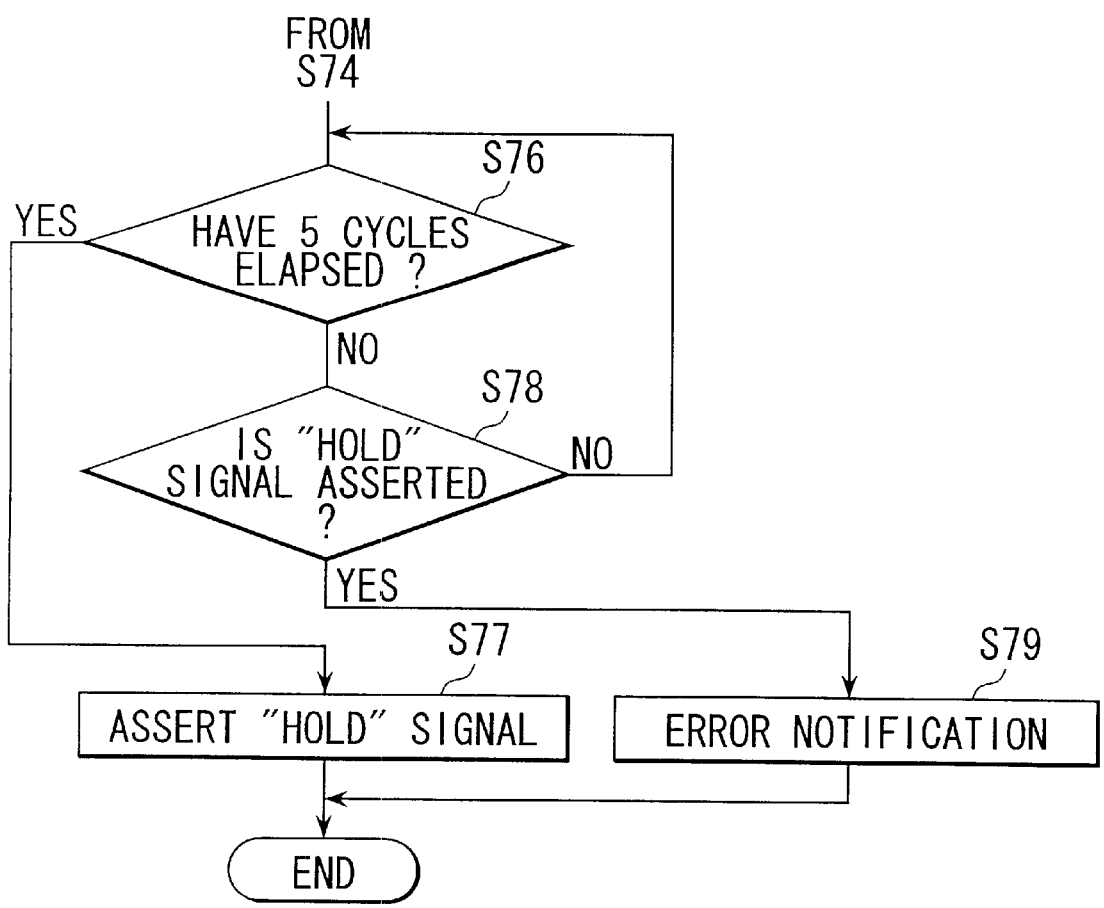
FIG. 18 shows the rest of the flow chart for explaining the clock frequency changing operation of each LSI in the second embodiment.

On the other hand, an operation obtained when a clock frequency is increased is as shown in FIGS. 16 to 18. When each of the LSIs 3 to 7 detects that the DOWN signal and the HOLD signal on the clock control bus 2 are not asserted (YES at step S53 in FIG. 16), the LSIs 3 to 7 start preparation for increasing the clock frequency (step S54). Here, the preparation for increasing the clock frequency is to wait for completion of an operation (process) which may be erroneous by changing the clock frequency and not to newly start such an operation.

When the DOWN signal and the HOLD signal on the clock control bus 2 are asserted over a predetermined number of clock cycles, i.e., 7 clock cycles (step S54a, S55), the LSIs 3 to 7 determine whether preparation for increasing the clock frequency is completed or not (step S56).

If the LSIs 3 to 7 includes an LSI which does not complete the preparation for increasing the clock frequency (NO at step S56), the LSI determines whether the clock frequency changing operation is aborted or delayed (step S57). In this determination, conditions for determining whether a prediction period of time required to complete the preparation is longer than a predetermined period of time can be used.

Of the LSIs which do not complete the preparations, an LSI which wants to abort a clock frequency changing operation asserts the HOLD signal and the DOWN signal for a predetermined number of clock cycles T, e.g., 8 clock cycles (T=8) as in a period from time t1 to time t2 in FIG. 23 to end the operation (step S58).

On the other hand, of the LSIs which do not complete the preparation, an LSI which wants to delay a clock frequency changing operation asserts the HOLD signal and the DOWN signal for a delay period longer than the predetermined number of clock cycles T, e.g., 8 clock cycles as in a period from time t1 to time t2 in FIG. 22 (step S59). Thereafter (i.e., after the HOLD signal and the DOWN signal is deasserted), the LSI returns to step S31 to perform the process of changing the clock frequency again.

In contrast to this, an LSI which completes preparation for increasing the clock frequency asserts the HOLD signal for the period T, e.g., 8 clock cycles as in a period from time t1 to time t2 in FIG. 21 (steps S60 to S63). More specifically, in the example in FIG. 21, the HOLD signal is asserted at time t1 (step S60), and is deasserted at time t2 after 8 clock cycles (steps S62 and S63). In the meantime, the LSI which completes the preparation determines whether or not the DOWN signal is asserted by the LSI which completes the preparation (step S61).

If it is detected that the DOWN signal is asserted (YES at step S61), the LSI which completes the preparation determines whether both the HOLD signal and the DOWN signal are asserted for the period of 8 clock cycles, or a period longer than 8 clock cycles (step S64). As in the example (times t1 to t2) in FIG. 23, both the HOLD signal and the DOWN signal are asserted for the period of 8 clock cycles (8 cycles of step S65), it is considered that the LSI which does not complete the preparation requests a clock frequency changing operation to be aborted, and the process ends. In contrast to this, if both the HOLD signal and the DOWN signal are asserted over 8 cycle clocks as in the example (times t1 to t2) in FIG. 22 (over 8 cycles of step S65), it is considered that the LSI which does not complete the preparation requests a clock frequency changing operation to be delayed, and the LSI returns to step S31 to perform the process for changing the clock frequency again.

Here, it is considered that all the LSIs 3 to 7 complete preparations for increasing the clock frequency, and that the HOLD signals are deasserted simultaneously at step S63. In this case, the HOLD signal on the clock control bus 2 is deasserted at time t2 in FIG. 21. However, thereafter, if the HOLD signal is kept deasserted (YES at step S66 in FIG. 17), an LSI which delays deasserting of the HOLD signal exists, and the clock frequency changing operations may not be synchronized with each other. For this reason, the clock frequency changing operation is aborted to end the operation (step S67).

If the LSIs 3 to 7 detect that the HOLD signal on the clock control bus 2 is deasserted (NO at step S66), the LSIs 3 to 7 assert the DOWN signals simultaneously after a predetermined number of clock cycles, e.g., 80 clock cycles elapse (YES at step S68) at time t3 in FIG. 21 (step S69). However, when the DOWN signal is asserted before the predetermined number of clock cycles elapse (i.e., before 80 clock cycles elapse) (step S70), an LSI which early asserts the DOWN signal exists, and the clock frequency changing operations may not be synchronized with each other. For this reason, the clock frequency changing operation is aborted to end the operation (step S67).

When the LSIs 3 to 7 assert the DOWN signals simultaneously (step S69), the LSIs 3 to 7 deassert the DOWN signals simultaneously after a predetermined number of clock cycles, e.g., 5 cycles at time t4 in FIG. 21 (steps S71 and S73), and increase the values N of the frequency setting registers R in the clock generation circuits CG in the LSIs 3 to 7 by only 1 to change the clock frequency in such a direction that the clock frequency is increased by a predetermined amount (step S74). However, if the DOWN signal on the clock control bus 2 is kept asserted after the DOWN signal is deasserted (NO at step S72), an LSI which delays deasserting of the DOWN signal exists, and the clock frequency changing operations may not be synchronized with each other. For this reason, the clock frequency changing operation is aborted to end the operation (step S75).

After the LSIs 3 to 7 change the clock frequency, the LSIs 3 to 7 assert the HOLD signals simultaneously after a predetermined number of clock cycles, e.g., 5 clock cycles elapse (YES at step S76 in FIG. 18) to end the operation (step S77). At this time, the LSIs 3 to 7 monitor the HOLD signal on the clock control bus 2 until 5 clock cycles elapse (step S78). If the HOLD signal is asserted before 5 clock cycles elapse, the LSIs 3 to 7 consider that clock synchronization is not established and that the clock frequency changing operation is failed, the LSIs 3 to 7 notify the OS of an error to end the operation (step S79). Note that the process at step S78, i.e., the process of confirming clock synchronization after the clock frequency changing operation is completed is not necessarily required.

In this manner, in the embodiment, when all the LSIs 3 to 7 detect that the HOLD signal is deasserted (step S66 in FIG. 17), thereafter, the LSIs 3 to 7 change the clock frequency 85 clock cycles (time t4 in the example in FIG. 21) after it is detected that the HOLD signal is deasserted (time t2 in the example in FIG. 21) while confirming that the clock frequency changing operations are synchronized with each other at a predetermined timing.

In contrast to this, when both the HOLD signal and the DOWN signal are asserted not to perform the clock frequency changing operation because synchronization between the LSIs 3 to 7 is not established (NO at step S53), the LSIs 3 to 7 return to step S31 to perform the process of changing the clock frequency again or to abort the clock frequency changing operation. FIG. 22 shows an example in which, because preparation for decreasing the clock frequency is not completed at least one of the LSIs 3 to 7, the HOLD signal and the DOWN signal are asserted for a period which is longer than 8 clock cycles from time t1 to time t2, and the process for changing the clock frequency is performed again after the period. Times t1' to t5' in FIG. 22 correspond to times t1 to t5 in FIG. 21, respectively.

In this manner, in this embodiment, the LSIs 3 to 7 monitor the assert and deassert timings of the HOLD signal and the DOWN signal on the clock control bus 2. If an LSI detects that the HOLD signal and the DOWN signal are asserted and deasserted at a timing different from that of own LSI, the LSI determines that the clock frequency changing operation is failed, and notifies of an error.

Since the operation of the system monitor LSI 11 is the same as that in the first embodiment, a description thereof will be omitted.

The second embodiment described above explains the case in which two types of signals, i.e., the HOLD signal and the DOWN signal on the clock control bus 2 are used. However, an UP signal representing that a clock frequency must be increased may also be added. In this case, although the structure of the clock control bus 2 is complex to some extent, it can be apparently designated by only the UP signal that a clock signal must be increased. For this reason, control becomes simple.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. In addition, the embodiments described above include inventions on various stages, and various inventions can be extracted by appropriate combinations of a plurality of structural elements. For example, even though some structural elements are removed from all the structural elements described in the embodiment, when the object of the present invention can be solved, and when the effect of the present invention can be obtained, the configuration from which the structural elements are removed can be extracted as the invention.

As has been described above, according to the present invention, the frequency of a clock generated by its own LSI can be dynamically changed by using at least a clock control bus in synchronism with another LSI.

What is claimed is:

1. A processor system comprising a plurality of semiconductor devices connected to a system bus, comprising:
   a clock control bus for adjusting a clock frequency, which is independent of the system bus,
   each of the semiconductor devices comprises:
      a variable clock generation circuit, connected to said clock control bus; and
      controller means for changing a clock frequency of said variable clock generation circuit in synchronism with another clock controller included in another semiconductor device during operation of its own semiconductor device.

2. The system according to claim 1, wherein
   said clock control bus comprises:
      a first signal indicating a change of the clock frequency in a predetermined direction; and
      a second signal indicating a change of the clock frequency in a direction opposing the predetermined direction or indicating that the clock frequency need not be changed, and
   said controller means comprises:
      monitor means for operating said first and second signals to indicate a present clock state; and
      means for changing the clock frequency based on the present clock state.

3. The system according to claim 2, wherein said changing means changes the clock frequency by using a transaction on the system bus.

4. The system according to claim 3, wherein
   said plurality of semiconductor devices comprises a master device serving as a master for a clock frequency changing operation and a target device which is a target of the bus transaction, said master device comprising:
      means for detecting that a predetermined clock state which is indicated by said first and second signals and in which the clock frequency should be changed is continued for a first time period;
      means for issuing the bus transaction for changing the clock frequency to the target device when said detecting means detects that the predetermined clock state is continued for the first time period; and
      means for changing the clock frequency when a second time period elapses after a normal completion notification with respect to the bus transaction is returned from the target device.

5. The system according to claim 3, wherein
said plurality of semiconductor devices comprises a master device serving as a master for a clock frequency changing operation and a target device which is a target of the bus transaction, said target device comprising:
means for determining whether or not it is possible to change the clock frequency when the bus transaction for changing the clock frequency is issued from the master device;
means for issuing a normal completion notification with respect to the bus transaction to the master device when said determining means determines that it is possible to change the clock frequency; and
means for changing the clock frequency when a predetermined time period elapses after the normal completion notification is issued.

6. The system according to claim 5, wherein said target device further comprises means for returning a retry response to the master device in a predetermined phase when said determining means determine that it is not possible to change the clock frequency.

7. The system according to claim 3, wherein
said plurality of semiconductor devices comprises a master device serving as a master for a clock frequency changing operation, a target device which is a target of the bus transaction, and a non-master/non-target device, said non-master/non-target device comprising:
means for determining whether or not it is possible to change the clock frequency when the bus transaction for changing the clock frequency is issued from the master device; and
means, when said determining means determines that it is possible to change the clock frequency, for changing the clock frequency when a predetermined time period elapses after a normal completion notification with respect to the bus transaction is returned from the target device to the master device.

8. The system according to claim 7, wherein said non-master/non-target device further comprises means for simultaneously asserting said first and second signals to notify other semiconductor devices that it is not possible to change the clock frequency when said determining means determines that it is not possible to change the clock frequency, one of said first and second signals being asserted or both of said first and second signals being deasserted in a normal state.

9. The system according to claim 2, wherein said controller means comprises:
means for detecting that a predetermined clock state which is indicated by said first and second signals and in which the clock frequency should be changed is continued for a first time period;
means for determining whether or not it is possible to change the clock frequency when said detecting means detects that the predetermined clock state is continued for the first time period;
means for executing, at least once, an operation of that clock frequency changing operations are synchronized with each other between other semiconductor devices by operating at least one of said first and second signals at a predetermined timing when said determining means determines that it is possible to change the clock frequency; and
means for changing the clock frequency based on a confirmation result of said executing means.

10. The system according to claim 9, wherein said executing means comprises:

means for asserting one of said first and second signals at a first timing and deasserting the asserted one of said first and second signals at a second timing; and
means for determining whether or not asserting timings of said plurality of semiconductor devices are synchronized and deasserting timings of said plurality of semiconductor devices are synchronized.

11. The system according to claim 2, wherein said controller means comprises:
means for operating at least one of said first and second signals to indicate a clock frequency changing preparation incompletion when it is possible to change the clock frequency; and
means for stopping a clock frequency changing operation when the clock frequency changing preparation incompletion is indicated by at least one of said operating means of own semiconductor device and said operating means of other semiconductor devices.

12. The system according to claim 2, wherein said controller means comprises:
means for operating at least one of said first and second signals to indicate a clock frequency changing preparation incompletion when it is possible to change the clock frequency; and
means for delaying a clock frequency changing operation when the clock frequency changing preparation incompletion is indicated by at least one of said operating means of own semiconductor device and said operating means of other semiconductor devices.

13. A semiconductor device having a clock frequency changing function comprising:
a clock generation circuit;
means for issuing a bus transaction for changing a clock frequency to a system bus when a usage right of the system bus can be acquired;
means for outputting a signal indicating an increase of the clock frequency, a signal indicating a decrease of the clock frequency, or a signal indicating that the clock frequency need not be changed, to a clock control bus thereby notifying another semiconductor device connected to the system bus of a clock changing operation; and
means for controlling the clock generation circuit to execute a clock frequency changing operation after a predetermined time period elapses provided that a retry request is not returned from the other semiconductor device, and for changing the signal on the clock control bus to the signal indicating that the clock frequency need not be changed.

14. A semiconductor device having a clock frequency changing function comprising:
a clock generation circuit;
means for receiving a bus transaction for changing a clock frequency issued to a system bus from another semiconductor device which is connected to the system bus and acquires a usage right of the system bus;
means for receiving a signal indicating an increase of the clock frequency, a signal indicating a decrease of the clock frequency, or a signal indicating that the clock frequency need not be changed from the other semiconductor device; and
means for returning a normal response to the other semiconductor device when it is possible to change the clock frequency as indicated by the signal received, controlling the clock generation circuit to execute a clock frequency changing operation after a predetermined time period elapses, and for changing the signal on a clock control bus to the signal indicating that the clock frequency need not be changed.

15. A computer system comprising:
   a system bus;
   a clock control bus, which is independent of the system bus, for transmitting a signal indicating an increase of the clock frequency, a signal indicating a decrease of the clock frequency, or a signal indicating that the clock frequency need not be changed; and
   first and second semiconductor devices connected to each other via said system bus and said control bus, each of the semiconductor devices comprising a clock generation circuit,
   wherein said first semiconductor device issues a clock frequency changing transaction to said second semiconductor device through the system bus;
   said second semiconductor device notifies said first semiconductor device that a clock frequency can be changed when it is possible to change the clock frequency as indicated by the transaction; and
   said first and second semiconductor devices synchronously execute clock frequency changing operations after a predetermined time period elapses.

16. The computer system according to claim 15, further comprising:
   a system monitor bus for connecting said first and second semiconductor devices to each other; and
   a system monitor device, connected to said system monitor bus, for comparing pieces of information for determining clock frequencies of said first and second clock generation circuits incorporated in said first and second semiconductor devices, thereby detecting a difference between the clock frequencies of said first and second semiconductor devices.

17. A computer system comprising:
   a system bus;
   a clock control bus, which is independent of the system bus; and
   first and second semiconductor devices connected to each other via said system bus and said control bus,
   wherein said first semiconductor device comprises:
      a first clock generation circuit;
      means for issuing a bus transaction for changing a clock frequency to the system bus when a usage right of the system bus can be acquired;
      means for outputting a signal indicating an increase of the clock frequency, a signal indicating a decrease of the clock frequency, or a signal indicating that the clock frequency need not be changed, to the clock control bus thereby notifying said second semiconductor device connected to the system bus of a clock changing operation; and
   means for controlling the first clock generation circuit to execute a clock frequency changing operation after a predetermined time period elapses provided that a retry request is not returned from the other semiconductor device, and for keeping the signal on the clock control bus to the signal indicating that the clock frequency need not be changed, and
   said second semiconductor device comprises:
      a second clock generation circuit;
      means for receiving the transaction for changing a clock frequency issued to the system bus from said first semiconductor device;
      means for receiving the signal indicating an increase of the clock frequency, the signal indicating a decrease of the clock frequency, or the signal indicating that the clock frequency need not be changed from said first semiconductor device; and
      means for returning a normal response to said first semiconductor device when it is possible to change the clock frequency as indicated by the signal received, controlling the second clock generation circuit to execute a clock frequency changing operation after the predetermined time period elapses, and for keeping the signal on the clock control bus to the signal indicating that the clock frequency need not be changed.

18. The computer system according to claim 17, further comprising:
   a system monitor bus for connecting said first and second semiconductor devices to each other; and
   a system monitor device, connected to said system monitor bus, for comparing pieces of information for determining clock frequencies of said first and second clock generation circuits incorporated in said first and second semiconductor devices, thereby detecting a difference between the clock frequencies of said first and second semiconductor devices.

19. A semiconductor device connected to a system bus and having a clock frequency changing function, the device comprising:
   a clock generation circuit;
   means for monitoring at least first and second signals output to a clock control bus which is independent of the system bus;
   means for deasserting said second signal when it is detected, because said first signal is not asserted, that its own semiconductor device completes a preparation of a clock frequency changing operation and that another semiconductor device connected to the system bus completes the preparation of a clock frequency changing operation, and for asserting said first signal to establish synchronization after a first time period elapses;
   means for deasserting said first signal after a second time period elapses thereby confirming that synchronization is established; and
   means for controlling a clock control circuit to execute a clock frequency changing operation after a third time period elapses.

20. A semiconductor device connected to a system bus and having a clock frequency changing function, the device comprising:
   a clock generation circuit;
   means for monitoring at least first and second signals output to a clock control bus which is independent of the system bus;
   means for asserting said first signal when said first and second signals are not asserted for a first time period and its own semiconductor device completes a preparation of a clock frequency changing operation, and for deasserting said first signal after a second time period elapses; and
   means for detecting, because said second signal is not asserted during the second time period, that another semiconductor device connected to the system bus also completes a preparation of a clock frequency changing operation, for asserting said second signal a third time period after the first signal is deasserted, for deasserting said second signal after a fourth time period elapses after the first signal is deasserted, and controlling the clock generation circuit to execute the clock frequency changing operation when a synchronization establishment is established.

21. A clock frequency changing method in a processor system comprising a plurality of semiconductor devices connected to a system bus and a clock control bus, which is independent of the system bus, each of the semiconductor devices comprising a variable clock generation circuit and being operated in synchronism with another semiconductor device, the method changing the clock frequencies of the variable clock generation circuits of said plurality of semiconductor devices in synchronism with each other during operation of said plurality of semiconductor devices.

* * * * *